US009807698B2

(12) United States Patent  
Zhang et al.

(10) Patent No.: US 9,807,698 B2  
(45) Date of Patent: Oct. 31, 2017

(54) DATA FRAME SENDING METHOD AND APPARATUS, AND DATA FRAME RECEIVING METHOD AND APPARATUS

(71) Applicant: Huawei Technologies Co., Ltd., Shenzhen (CN)

(72) Inventors: Jiayin Zhang, Shanghai (CN); Yingpei Lin, Shanghai (CN); Yi Luo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 169 days.

(21) Appl. No.: 15/011,011

(22) Filed: Jan. 29, 2016

(65) Prior Publication Data

US 2016/0165549 A1    Jun. 9, 2016

Related U.S. Application Data

(63) Continuation of application No. PCT/CN2013/080539, filed on Jul. 31, 2013.

(51) Int. Cl.  
*H04L 1/00* (2006.01)  
*H04W 52/24* (2009.01)  
(Continued)

(52) U.S. Cl.  
CPC ....... *H04W 52/243* (2013.01); *H04W 52/367* (2013.01); *H04W 52/50* (2013.01); *H04W 52/143* (2013.01); *H04W 52/38* (2013.01)

(58) Field of Classification Search  
CPC ......... H04L 47/10; H04L 47/12; H04L 47/20; H04L 47/24; H04L 47/32; H04L 47/38;  
(Continued)

(56) References Cited

U.S. PATENT DOCUMENTS 7,489,943 B2 *  2/2009  Jones .................. H04W 52/286  
                                                          455/126  
8,452,321 B2 *  5/2013  Fodor ................. H04W 52/367  
                                                          370/315

(Continued)

FOREIGN PATENT DOCUMENTS

CN  101018082 A  8/2007  
CN  101741420 A  6/2010  
(Continued)

OTHER PUBLICATIONS

"3rd Generation Partnership Project; Technical Specification Group Radio Access Network; Evolved Universal Terrestrial Radio Access (E-UTRA); LTE Physical Layer; General Description (Release 11)," 3GPP TS 36.201 V11.1.0, Dec. 2012, 13 pages.

(Continued)

*Primary Examiner* — Dady Chery  
(74) *Attorney, Agent, or Firm* — Slater Matsil, LLP

(57) ABSTRACT

The present invention provides a data frame sending and receiving method and apparatus. The data frame sending method includes: receiving, by a first access point, first interference power parameters fed back by associated stations of the first access point, and receiving second interference power parameters sent by a second access point; if determining that a channel on which the first access point works is currently being occupied by the second access point, determining to-be-scheduled stations and transmission powers of the first access point for the to-be-scheduled stations, sending scheduling indication signaling at the determined transmission powers, and receiving scheduling indication response signaling sent by a schedulable station; and sending a data frame to the schedulable station at a transmission power corresponding to the schedulable station among the determined transmission powers.

20 Claims, 8 Drawing Sheets

(51) Int. Cl.
*H04W 52/36* (2009.01)
*H04W 52/50* (2009.01)
*H04W 52/14* (2009.01)
*H04W 52/38* (2009.01)

(58) Field of Classification Search
CPC ......... H04L 47/70; H04L 47/72; H04L 47/74;
H04L 47/78; H04L 47/80; H04L 43/00;
H04L 43/50; H04B 17/00; H04B 3/46;
H04B 7/00; H04W 24/00
USPC ....... 370/229, 230, 252, 310, 311, 312, 329,
370/330, 339, 34; 455/572, 573, 574,
455/343.1, 343.2, 343.4
See application file for complete search history.

(56) References Cited

U.S. PATENT DOCUMENTS

| | | | | |
|---|---|---|---|---|
| 8,977,311 | B2* | 3/2015 | Osterling | H04L 1/0001 455/114.2 |
| 9,629,078 | B2* | 4/2017 | Seok | H04W 52/0206 |
| 2006/0252449 | A1* | 11/2006 | Ramesh, Sr. | H04W 52/44 455/522 |
| 2009/0082026 | A1 | 3/2009 | Yavuz et al. | |
| 2009/0197588 | A1 | 8/2009 | Khandekar et al. | |
| 2011/0096760 | A1 | 4/2011 | Lee et al. | |
| 2015/0333934 | A1 | 11/2015 | Wan et al. | |
| 2016/0073434 | A1* | 3/2016 | Zhang | H04W 74/006 370/329 |

FOREIGN PATENT DOCUMENTS

| | | |
|---|---|---|
| CN | 101803429 A | 8/2010 |
| EP | 2640139 A1 | 9/2013 |
| JP | 2013102479 A | 5/2013 |
| WO | 2009039477 A1 | 3/2009 |
| WO | 2012063932 A1 | 5/2012 |

OTHER PUBLICATIONS

"3rd Generation Partnership Project; Technical Specification Group Radio Access Network; Evolved Universal Terrestrial Radio Access (E-UTRA); Physical Channels and Modulation (Release 11)," 3GPP TS 36.211 V11.6.0, Sep. 2014, 120 pages.

"3rd Generation Partnership Project; Technical Specification Group Radio Access Network; Evolved Universal Terrestrial Radio Access (E-UTRA); Multiplexing and Channel Coding (Release 11)," 3GPP TS 36.212 V11.3.0, Jun. 2013, 84 pages.

"3rd Generation Partnership Project; Technical Specification Group Radio Access Network; Evolved Universal Terrestrial Radio Access (E-UTRA); Physical Layer Procedures (Release 11)," 3GPP TS 36.213 V11.3.0, Jun. 2013, 176 pages.

"3rd Generation Partnership Project; Technical Specification Group Radio Access Network; Evolved Universal Terrestrial Radio Access (E-UTRA); Physical layer; Measurements (Release 11)," 3GPP TS 36.214 V11.1.0, Dec. 2012, 14 pages.

"Network Assisted Home eNodeB Transmission Power Control in Downlink," Source: Kyocera, Agenda Item: 7.6 FDD HeNB RF Requirements [HeNB-RF_FDD], Document for: Discussion, TSG-RAN Working Goup 4 (Radio) Meeting #52bis, R4-093619, Oct. 12-16, 2009, 6 pages.

"Baseline for Discussions on Further Way Forward for HeNB," Agenda Item: 7.6, Source: Motorola, Vodafone, CMCC, NEC, picoChip, Institute for Information Industry (III), Caller Corporation, Nokia Siemens Networks, Kyocera, Qualcomm, Document for: Discussion, 3GPP TSG-RAN WG4 Meeting #52bis, R4-094093, Oct. 12-16, 2009, 5 pages.

* cited by examiner

| Frame control (Frame Control) | Frame duration (Duration) | Receive address (Receive Address, RA for short below) | Transmission address (Transmission Address, TA for short below) | Transmission power (Transmission Power, TxPwr for short below) | Frame check sequence (Frame Check Sequence, FCS for short below) |

MAC header

DATA FRAME SENDING METHOD AND APPARATUS, AND DATA FRAME RECEIVING METHOD AND APPARATUS

This application is a continuation of International Patent Application No. PCT/CN2013/080539, filed on Jul. 31, 2013, which is hereby incorporated by reference in its entirety.

TECHNICAL FIELD

The present invention relates to communications technologies, and in particular, to a data frame sending method and apparatus, and a data frame receiving method and apparatus.

BACKGROUND

Management of interference from neighboring cells in a wireless communications network is a key means for increasing a network throughput, and is attracting wide attention from the industry.

In a cellular communications system, as users require more from services, a network is required to be capable of bearing a larger throughput.

An existing technical solution is that, in Long Term Evolution (Long Term Evolution, LTE for short below) Rel-8/9, a throughput of cell edge users is increased by reducing interference from neighboring cells by using the inter-cell interference coordination (Inter Cell Interference Coordination, ICIC for short below) algorithm. Specifically, ICIC may be implemented by means of soft frequency reuse (Soft Frequency Reuse, SFR for short below). However, frequency band allocation in SFR is a static process, in which a frequency and a bandwidth that are for use of cell edge users need to be determined during network deployment. However, static frequency spectrum division cannot adapt to transient changes in service and user distribution, causing waste of spectrum resources.

The existing technical solution for increasing a network capacity cannot adapt to the transient changes in service and user distribution, causing waste in spectrum resources.

SUMMARY

The present invention provides a data frame sending method and apparatus, and a data frame receiving method and apparatus, so as to improve utilization of network spectrum resources.

According to a first aspect of the present invention, a data frame sending method is provided, including:

receiving, by a first access point, first interference power parameters fed back by associated stations of the first access point, where a coverage area of the first access point overlaps a coverage area of a second access point; where the first interference power parameter is used to indicate a transmission power or a transmission power reduction value of the second access point under a condition that communication between the first access point and the associated station of the first access point is not affected;

receiving, by the first access point, second interference power parameters sent by the second access point, where the second interference power parameters are fed back by associated stations of the second access point to the second access point; where the second interference power parameter is used to indicate a transmission power or a transmission power reduction value of the first access point under a condition that communication between the second access point and the associated station of the second access point is not affected;

if the first access point determines that a channel on which the first access point works is currently being occupied by the second access point, determining, by the first access point, to-be-scheduled stations of the first access point and transmission powers of the first access point for the to-be-scheduled stations according to the first interference power parameters, the second interference power parameters, and a transmission power of the second access point that is currently occupying the channel;

sending, by the first access point, scheduling indication signaling to the to-be-scheduled stations at the determined transmission powers, and receiving scheduling indication response signaling sent by a schedulable station among the to-be-scheduled stations; and sending, by the first access point, a data frame to the schedulable station at a transmission power corresponding to the schedulable station among the determined transmission powers.

With reference to the first aspect, in a first possible implementation manner of the first aspect, the first interference power parameter includes a harmless transmission power upper limit of the second access point, where the harmless transmission power upper limit of the second access point is an allowed maximum transmission power of the second access point under the condition that communication between the first access point and the associated station of the first access point is not affected; and the second interference power parameter includes a harmless transmission power upper limit of the first access point, where the harmless transmission power upper limit of the first access point is an allowed maximum transmission power of the first access point under the condition that communication between the second access point and the associated station of the second access point is not affected.

With reference to the first aspect, in a second possible implementation manner of the first aspect, the determining, by the first access point, that a channel on which the first access point works is currently being occupied by the second access point includes:

if the first access point receives the scheduling indication signaling by listening on the channel on which the first access point works, and the first access point determines that a transmission address carried in the received scheduling indication signaling is an address of the second access point, determining, by the first access point, that the channel is currently being occupied by the second access point; or, if the first access point receives the scheduling indication response signaling by listening on the channel on which the first access point works, and the first access point determines that a receive address carried in the received scheduling indication response signaling is an address of the second access point, determining, by the first access point, that the channel is currently being occupied by the second access point.

With reference to the first aspect, or the first or second possible implementation manner of the first aspect, in a third possible implementation manner of the first aspect, the second access point is the second access point that is currently occupying the channel on which the first access point works, and the associated station of the second access point is a station, among the associated stations of the second access point that is currently occupying the channel, that is communicating with the second access point that is currently occupying the channel; and the determining, by the first access point, to-be-scheduled stations of the first access point and transmission powers of the first access point for the to-be-scheduled stations according to the first interference power parameters, the second interference power parameters, and a transmission power of the second access point that is currently occupying the channel includes:

selecting, by the first access point, the to-be-scheduled stations from the associated stations of the first access point, where a transmission power required by the to-be-scheduled station is less than the second interference power parameter, and the transmission power of the second access point is less than a third interference power parameter, where the third interference power parameter is at least one of the first interference power parameters and is used to indicate a transmission power of the second access point under a condition that communication between the first access point and the to-be-scheduled station is not affected; and determining, by the first access point, that the transmission power of the first access point for the to-be-scheduled station is the transmission power required by the to-be-scheduled station.

With reference to the first aspect or the second possible implementation manner of the first aspect, in a fourth possible implementation manner of the first aspect, the first interference power parameter includes a harmless power reduction value of the second access point, where the harmless power reduction value of the second access point is used to indicate a numerical value by which a maximum transmission power of the second access point needs to be reduced under the condition that communication between the first access point and the associated station of the first access point is not affected; and the second interference power parameter includes a harmless power reduction value of the first access point, where the harmless power reduction value of the first access point is used to indicate a numerical value by which a maximum transmission power of the first access point needs to be reduced under the condition that communication between the second access point and the associated station of the second access point is not affected;

the second access point is the second access point that is currently occupying the channel on which the first access point works, and the associated station of the second access point is a station, among the associated stations of the second access point that is currently occupying the channel, that is communicating with the second access point that is currently occupying the channel; and the determining, by the first access point, to-be-scheduled stations of the first access point and transmission powers of the first access point for the to-be-scheduled stations according to the first interference power parameters, the second interference power parameters, and a transmission power of the second access point that is currently occupying the channel includes:

using, by the first access point, a difference between the maximum transmission power of the second access point and the first interference power parameter as a harmless transmission power upper limit of the second access point, and using a difference between the maximum transmission power of the first access point and the second interference power parameter as a harmless transmission power upper limit of the first access point, where the harmless transmission power upper limit of the second access point is an allowed maximum transmission power of the second access point under the condition that communication between the first access point and the associated station of the first access point is not affected, and the harmless transmission power upper limit of the first access point is an allowed maximum transmission power of the first access point under the condition that communication between the second access point and the associated station of the second access point is not affected;

selecting, by the first access point, the to-be-scheduled stations from the associated stations of the first access point, where a transmission power required by the to-be-scheduled station is less than a harmless transmission power upper limit of the first access point for the associated station of the second access point, and the transmission power of the second access point is less than a harmless transmission power upper limit of the second access point for the to-be-scheduled station; and determining, by the first access point, that the transmission power of the first access point for the to-be-scheduled station is the transmission power required by the to-be-scheduled station.

With reference to the first aspect, or the first or second possible implementation manner of the first aspect, in a fifth possible implementation manner of the first aspect, the sending scheduling indication signaling to the to-be-scheduled station includes:

when the to-be-scheduled stations include at least two stations, sending, by the first access point, the scheduling indication signaling to each station of the at least two stations in turn, or sending, by the first access point, the scheduling indication signaling to the at least two stations at the same time.

With reference to the first aspect, or the first or second possible implementation manner of the first aspect, in a sixth possible implementation manner of the first aspect, a frame structure of the scheduling indication signaling or the scheduling indication response signaling includes at least one of a frame control field, a receive address field, a transmission address field and a transmission power field, where different values of the frame control field indicate that a frame with the frame structure is scheduling indication signaling or scheduling indication response signaling, and a value of the transmission power field is the determined transmission power.

According to a second aspect of the present invention, a data frame receiving method is provided, including:

measuring, by a station, a first interference power parameter, where the first interference power parameter is used to indicate a transmission power or a transmission power reduction value of a second access point under a condition that communication between a first access point and the station is not affected, where the first access point is an associated access point of the station, and a coverage area of the first access point overlaps a coverage area of the second access point;

feeding back, by the station, the first interference power parameter to the first access point, so that when the first access point determines that a channel on which the first access point works is currently being occupied by the second access point, the first access point determines, according to the first interference power parameter, a second interference power parameter that is sent by the second access point and a transmission power of the second access point that is currently occupying the channel, that the station is a to-be-scheduled station of the first access point, and a transmission power of the first access point for the station, where the second interference power parameter is used to indicate a transmission power or a transmission power reduction value of the first access point under a condition that communication between the second access point and an associated station of the second access point is not affected;

after the station receives scheduling indication signaling that is sent by the first access point at the determined transmission power, if determining that the station is schedulable by the first access point, sending, by the station, scheduling indication response signaling to the first access point; and receiving, by the station, a data frame that is sent by the first access point at the determined transmission power.

With reference to the second aspect, in a first possible implementation manner of the second aspect, the first interference power parameter includes a harmless transmission power upper limit of the second access point, where the harmless transmission power upper limit of the second access point is an allowed maximum transmission power of the second access point under the condition that communication between the station and the first access point is not affected.

With reference to the first possible implementation manner of the second aspect, in a second possible implementation manner of the second aspect, the measuring, by a station, a first interference power parameter includes:

measuring, by the station, received energy of a signal that is sent by the station to the second access point by using a full power;

determining, by the station, a harmless power reduction value of the second access point according to the received energy and a clear channel assessment threshold of the station, where the harmless power reduction value of the second access point is used to indicate a numerical value by which the maximum transmission power of the second access point needs to be reduced under the condition that communication between the station and the first access point is not affected; and using, by the station, a difference between the maximum transmission power of the second access point and the harmless power reduction value as the harmless transmission power upper limit of the second access point.

With reference to the second aspect, in a third possible implementation manner of the second aspect, the first interference power parameter includes a harmless power reduction value of the second access point, where the harmless power reduction value of the second access point is used to indicate a numerical value by which the maximum transmission power of the second access point needs to be reduced under the condition that communication between the station and the first access point is not affected.

With reference to the third possible implementation manner of the second aspect, in a fourth possible implementation manner of the second aspect, the measuring, by a station, a first interference power parameter of a second access point for the station includes:

measuring, by the station, received energy of a signal that is sent by the station to the second access point by using a full power; and determining, by the station, the harmless power reduction value of the second access point according to the received energy and a clear channel assessment threshold of the station.

According to a third aspect of the present invention, a data frame sending apparatus is provided, where the data frame sending apparatus is configured in a first access point, and the data frame sending apparatus includes:

a receiving module, configured to receive first interference power parameters fed back by associated stations of the first access point; and receive second interference power parameters sent by a second access point, where the second interference power parameters are fed back by associated stations of the second access point to the second access point; where a coverage area of the first access point overlaps a coverage area of the second access point, the first interference power parameter is used to indicate a transmission power or a transmission power reduction value of the second access point under a condition that communication between the first access point and the associated station of the first access point is not affected, and the second interference power parameter is used to indicate a transmission power or a transmission power reduction value of the first access point under a condition that communication between the second access point and the associated station of the second access point is not affected;

a determining module, configured to determine that a channel on which the first access point works is currently being occupied by the second access point, and determine to-be-scheduled stations of the first access point and transmission powers of the first access point for the to-be-scheduled stations according to the first interference power parameters, the second interference power parameters, and a transmission power of the second access point that is currently occupying the channel; and a sending module, configured to send scheduling indication signaling to the to-be-scheduled stations at the transmission powers determined by the determining module, and after the receiving module receives scheduling indication response signaling sent by a schedulable station among the to-be-scheduled stations, send a data frame to the schedulable station at a transmission power corresponding to the schedulable station among the transmission powers determined by the determining module, where the receiving module is further configured to: after the sending module sends the scheduling indication signaling, receive the scheduling indication response signaling sent by the schedulable station among the to-be-scheduled stations.

With reference to the third aspect, in a first possible implementation manner of the third aspect, the first interference power parameter received by the receiving module includes a harmless transmission power upper limit of the second access point, where the harmless transmission power upper limit of the second access point is an allowed maximum transmission power of the second access point under the condition that communication between the first access point and the associated station of the first access point is not affected; and the second interference power parameter received by the receiving module includes a harmless transmission power upper limit of the first access point, where the harmless transmission power upper limit of the first access point is an allowed maximum transmission power of the first access point under the condition that communication between the second access point and the associated station of the second access point is not affected.

With reference to the third aspect, in a second possible implementation manner of the third aspect, the determining module being configured to determine that a channel on which the first access point works is currently being occupied by the second access point includes:

the determining module being specifically configured to: when receiving the scheduling indication signaling by listening on the channel on which the first access point works, and determining that a transmission address carried in the received scheduling indication signaling is an address of the second access point, determine that the channel is currently being occupied by the second access point; or, when receiving the scheduling indication response signaling by listening on the channel on which the first access point works, and determining that a receive address carried in the received scheduling indication response signaling is an address of the second access point, determine that the channel is currently being occupied by the second access point.

With reference to the third aspect, or the first or second possible implementation manner of the third aspect, in a third possible implementation manner of the third aspect, the second access point is the second access point that is currently occupying the channel, and the associated station of the second access point is a station, among the associated stations of the second access point that is currently occupying the channel, that is communicating with the second access point that is currently occupying the channel; and the determining module being configured to determine to-be-scheduled stations of the first access point and transmission powers of the first access point for the to-be-scheduled stations according to the first interference power parameters, the second interference power parameters, and a transmission power of the second access point that is currently occupying the channel includes:

the determining module being specifically configured to select the to-be-scheduled stations from the associated stations of the first access point, where a transmission power required by the to-be-scheduled station is less than the second interference power parameter, and the transmission power of the second access point is less than a third interference power parameter, and determine that the transmission power of the first access point for the to-be-scheduled station is the transmission power required by the to-be-scheduled station, where the third interference power parameter is at least one of the first interference power parameters and is used to indicate a transmission power of the second access point under a condition that communication between the first access point and the to-be-scheduled station is not affected.

With reference to the third aspect or the second possible implementation manner of the third aspect, in a fourth possible implementation manner of the third aspect, the first interference power parameter received by the receiving module includes a harmless power reduction value of the second access point, where the harmless power reduction value of the second access point is used to indicate a numerical value by which a maximum transmission power of the second access point needs to be reduced under the condition that communication between the first access point and the associated station of the first access point is not affected; the second interference power parameter received by the receiving module includes a harmless power reduction value of the first access point, where the harmless power reduction value of the first access point is used to indicate a numerical value by which a maximum transmission power of the first access point needs to be reduced under the condition that communication between the second access point and the associated station of the second access point is not affected; the second access point is the second access point that is currently occupying the channel on which the first access point works; and the associated station of the second access point is a station, among the associated stations of the second access point that is currently occupying the channel, that is communicating with the second access point that is currently occupying the channel; and the determining module being configured to determine to-be-scheduled stations of the first access point and transmission powers of the first access point for the to-be-scheduled stations according to the first interference power parameters, the second interference power parameters, and a transmission power of the second access point that is currently occupying the channel includes:

the determining module being specifically configured to use a difference between the maximum transmission power of the second access point and the first interference power parameter as a harmless transmission power upper limit of the second access point, and use a difference between the maximum transmission power of the first access point and the second interference power parameter as a harmless transmission power upper limit of the first access point; select the to-be-scheduled stations from the associated stations of the first access point, where a transmission power required by the to-be-scheduled station is less than a harmless transmission power upper limit of the first access point for the associated station of the second access point, and the transmission power of the second access point is less than a harmless transmission power upper limit of the second access point for the to-be-scheduled station; and determine that the transmission power of the first access point for the to-be-scheduled station is the transmission power required by the to-be-scheduled station.

With reference to the third aspect, or the first or second possible implementation manner of the third aspect, in a fifth possible implementation manner of the third aspect, the sending module being configured to send scheduling indication signaling to the to-be-scheduled stations includes:

the sending module being specifically configured to: when the to-be-scheduled stations include at least two stations, send the scheduling indication signaling to each station of the at least two stations in turn, or send the scheduling indication signaling to the at least two stations at the same time.

According to a fourth aspect of the present invention, a data frame receiving apparatus is provided, where the data frame receiving apparatus is configured in a station, and the data frame receiving apparatus includes:

a measuring module, configured to measure a first interference power parameter, where the first interference power parameter is used to indicate a transmission power or a transmission power reduction value of a second access point under a condition that communication between a first access point and the station is not affected, where the first access point is an associated access point of the station, and a coverage area of the first access point overlaps a coverage area of the second access point;

a sending module, configured to feed back the first interference power parameter measured by the measuring module to the first access point, so that when the first access point determines that a channel on which the first access point works is currently being occupied by the second access point, the first access point determines, according to the first interference power parameter, a second interference power parameter that is sent by the second access point and a transmission power of the second access point that is currently occupying the channel, that the station is a to-be-scheduled station of the first access point, and a transmission power of the first access point for the station, where the second interference power parameter is used to indicate a transmission power or a transmission power reduction value of the first access point under a condition that communication between the second access point and an associated station of the second access point is not affected;

a receiving module, configured to receive scheduling indication signaling that is sent by the first access point at the determined transmission power; and a determining module, configured to: after the receiving module receives the scheduling indication signaling, determine that the station is schedulable by the first access point, where the sending module is further configured to: after the determining module determines that the station is schedulable by the first access point, send scheduling indication response signaling to the first access point; and the receiving module is further configured to: after the sending module sends the scheduling indication response signaling, receive a data frame that is sent by the first access point at the determined transmission power.

With reference to the fourth aspect, in a first possible implementation manner of the fourth aspect, the first interference power parameter measured by the measuring module includes a harmless transmission power upper limit of the second access point, where the harmless transmission power upper limit of the second access point is an allowed maximum transmission power of the second access point under the condition that communication between the station and the first access point is not affected.

With reference to the first possible implementation manner of the fourth aspect, in a second possible implementation manner of the fourth aspect, the measuring module is specifically configured to measure received energy of a signal that is sent by the station to the second access point by using a full power; determine a harmless power reduction value of the second access point according to the received energy and a clear channel assessment threshold of the station; and use a difference between the maximum transmission power of the second access point and the harmless power reduction value as the harmless transmission power upper limit of the second access point.

With reference to the fourth aspect, in a third possible implementation manner of the fourth aspect, the first interference power parameter measured by the measuring module includes a harmless power reduction value of the second access point, where the harmless power reduction value of the second access point is used to indicate a numerical value by which the maximum transmission power of the second access point needs to be reduced under the condition that communication between the station and the first access point is not affected.

With reference to the third possible implementation manner of the fourth aspect, in a fourth possible implementation manner of the fourth aspect, the measuring module is specifically configured to measure received energy of a signal that is sent by the station to the second access point by using a full power; and determine the harmless power reduction value of the second access point according to the received energy and a clear channel assessment threshold of the station.

According to a fifth aspect of the present invention, a first access point is provided, including: a transmitter, a receiver, a memory, and a processor that is separately connected to the transmitter, the receiver and the memory, where the receiver is configured to receive first interference power parameters fed back by associated stations of the first access point; and receive second interference power parameters sent by a second access point, where the second interference power parameters are fed back by associated stations of the second access point to the second access point; where a coverage area of the first access point overlaps a coverage area of the second access point, the first interference power parameter is used to indicate a transmission power or a transmission power reduction value of the second access point under a condition that communication between the first access point and the associated station of the first access point is not affected, and the second interference power parameter is used to indicate a transmission power or a transmission power reduction value of the first access point under a condition that communication between the second access point and the associated station of the second access point is not affected;

the memory is configured to store a group of program code;

the processor is configured to invoke the program code stored in the memory, to determine that a channel on which the first access point works is currently being occupied by the second access point, and determine to-be-scheduled stations of the first access point and transmission powers of the first access point for the to-be-scheduled stations according to the first interference power parameters, the second interference power parameters, and a transmission power of the second access point that is currently occupying the channel;

the transmitter is configured to send scheduling indication signaling to the to-be-scheduled stations at the transmission powers determined by the processor, and after the receiver receives scheduling indication response signaling sent by a schedulable station among the to-be-scheduled stations, send a data frame to the schedulable station at a transmission power corresponding to the schedulable station among the transmission powers determined by the processor; and the receiver is further configured to: after the transmitter sends the scheduling indication signaling, receive the scheduling indication response signaling sent by the schedulable station among the to-be-scheduled stations.

With reference to the fifth aspect, in a first possible implementation manner of the fifth aspect, the first interference power parameter received by the receiver includes a harmless transmission power upper limit of the second access point, where the harmless transmission power upper limit of the second access point is an allowed maximum transmission power of the second access point under the condition that communication between the first access point and the associated station of the first access point is not affected; and the second interference power parameter received by the receiver includes a harmless transmission power upper limit of the first access point, where the harmless transmission power upper limit of the first access point is an allowed maximum transmission power of the first access point under the condition that communication between the second access point and the associated station of the second access point is not affected.

With reference to the fifth aspect, in a second possible implementation manner of the fifth aspect, the processor being configured to determine that a channel on which the first access point works is currently being occupied by the second access point includes:

the processor being specifically configured to: when receiving the scheduling indication signaling by listening on the channel on which the first access point works, and determining that a transmission address carried in the received scheduling indication signaling is an address of the second access point, determine that the channel is currently being occupied by the second access point; or, when receiving the scheduling indication response signaling by listening on the channel on which the first access point works, and determining that a receive address carried in the received scheduling indication response signaling is an address of the second access point, determine that the channel is currently being occupied by the second access point.

With reference to the fifth aspect, or the first or second possible implementation manner of the fifth aspect, in a third possible implementation manner of the fifth aspect, the second access point is the second access point that is currently occupying the channel on which the first access point works, and the associated station of the second access point is a station, among the associated stations of the second access point that is currently occupying the channel, that is communicating with the second access point that is currently occupying the channel; and the processor being configured to determine to-be-scheduled stations of the first access point and transmission powers of the first access point for the to-be-scheduled stations according to the first interference power parameters, the second interference power parameters, and a transmission power of the second access point that is currently occupying the channel includes:

the processor being specifically configured to select the to-be-scheduled stations from the associated stations of the first access point, where a transmission power required by the to-be-scheduled station is less than the second interference power parameter, and the transmission power of the second access point is less than a third interference power parameter, where the third interference power parameter is at least one of the first interference power parameters and is used to indicate a transmission power of the second access point under a condition that communication between the first access point and the to-be-scheduled station is not affected, and determine that the transmission power of the first access point for the to-be-scheduled station is the transmission power required by the to-be-scheduled station.

With reference to the fifth aspect or the second possible implementation manner of the fifth aspect, in a fourth possible implementation manner of the fifth aspect, the first interference power parameter includes a harmless power reduction value of the second access point, where the harmless power reduction value of the second access point is used to indicate a numerical value by which a maximum transmission power of the second access point needs to be reduced under the condition that communication between the first access point and the associated station of the first access point is not affected; and the second interference power parameter includes a harmless power reduction value of the first access point, where the harmless power reduction value of the first access point is used to indicate a numerical value by which a maximum transmission power of the first access point needs to be reduced under the condition that communication between the second access point and the associated station of the second access point is not affected;

the second access point is the second access point that is currently occupying the channel on which the first access point works, and the associated station of the second access point is a station, among the associated stations of the second access point that is currently occupying the channel, that is communicating with the second access point that is currently occupying the channel; and the processor being configured to determine to-be-scheduled stations of the first access point and transmission powers of the first access point for the to-be-scheduled stations according to the first interference power parameters, the second interference power parameters, and a transmission power of the second access point that is currently occupying the channel includes:

the processor being specifically configured to use a difference between the maximum transmission power of the second access point and the first interference power parameter as a harmless transmission power upper limit of the second access point, and use a difference between the maximum transmission power of the first access point and the second interference power parameter as a harmless transmission power upper limit of the first access point; select the to-be-scheduled stations from the associated stations of the first access point, where a transmission power required by the to-be-scheduled station is less than a harmless transmission power upper limit of the first access point for the associated station of the second access point, and the transmission power of the second access point is less than a harmless transmission power upper limit of the second access point for the to-be-scheduled station; and determine that the transmission power of the first access point for the to-be-scheduled station is the transmission power required by the to-be-scheduled station.

With reference to the fifth aspect, or the first or second possible implementation manner of the fifth aspect, in a fifth possible implementation manner of the fifth aspect, the transmitter being configured to send scheduling indication signaling to the to-be-scheduled stations includes:

the transmitter being specifically configured to: when the to-be-scheduled stations include at least two stations, send the scheduling indication signaling to each station of the at least two stations in turn, or send the scheduling indication signaling to the at least two stations at the same time.

According to a sixth aspect of the present invention, a station is provided, including: a transmitter, a receiver, a memory, and a processor that is separately connected to the transmitter, the receiver and the memory, where the memory is configured to store a group of program code;

the processor is configured to invoke the program code stored in the memory, to measure a first interference power parameter, where the first interference power parameter is used to indicate a transmission power or a transmission power reduction value of a second access point under a condition that communication between a first access point and the station is not affected, where the first access point is an associated access point of the station, and a coverage area of the first access point overlaps a coverage area of the second access point;

the transmitter is configured to feed back the first interference power parameter measured by the processor to the first access point, so that when the first access point determines that a channel on which the first access point works is currently being occupied by the second access point, the first access point determines, according to the first interference power parameter, a second interference power parameter that is sent by the second access point and a transmission power of the second access point that is currently occupying the channel, that the station is a to-be-scheduled station of the first access point, and a transmission power of the first access point for the station, where the second interference power parameter is used to indicate a transmission power or a transmission power reduction value of the first access point under a condition that communication between the second access point and an associated station of the second access point is not affected;

the receiver, configured to receive scheduling indication signaling that is sent by the first access point at the determined transmission power;

the processor is further configured to: after the receiver receives the scheduling indication signaling, determine that the station is schedulable by the first access point;

the transmitter is further configured to: after the processor determines that the station is schedulable by the first access point, send scheduling indication response signaling to the first access point; and the receiver is further configured to: after the transmitter sends the scheduling indication response signaling, receive a data frame that is sent by the first access point at the determined transmission power.

With reference to the sixth aspect, in a first possible implementation manner of the sixth aspect, the first interference power parameter measured by the processor includes a harmless transmission power upper limit of the second access point, where the harmless transmission power upper limit of the second access point is an allowed maximum transmission power of the second access point under the condition that communication between the station and the first access point is not affected.

With reference to the first possible implementation manner of the sixth aspect, in a second possible implementation manner of the sixth aspect, the processor is specifically configured to measure received energy of a signal that is sent by the station to the second access point by using a full power; determine a harmless power reduction value of the second access point according to the received energy and a clear channel assessment threshold of the station; and use a difference between the maximum transmission power of the second access point and the harmless power reduction value as the harmless transmission power upper limit of the second access point.

With reference to the sixth aspect, in a third possible implementation manner of the sixth aspect, the first interference power parameter measured by the processor includes a harmless power reduction value of the second access point, where the harmless power reduction value of the second access point is used to indicate a numerical value by which the maximum transmission power of the second access point needs to be reduced under the condition that communication between the station and the first access point is not affected.

With reference to the third possible implementation manner of the sixth aspect, in a fourth possible implementation manner of the sixth aspect, the processor is specifically configured to measure received energy of a signal that is sent by the station to the second access point by using a full power; and determine the harmless power reduction value of the second access point according to the received energy and a clear channel assessment threshold of the station.

A technical effect of the present invention is that: a first access point determines, according to a first interference power parameter, a second interference power parameter, and a transmission power of a second access point that is currently occupying the channel, a to-be-scheduled station of the first access point and a transmission power of the first access point for the to-be-scheduled station, thereby improving utilization of network spectrum resources.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
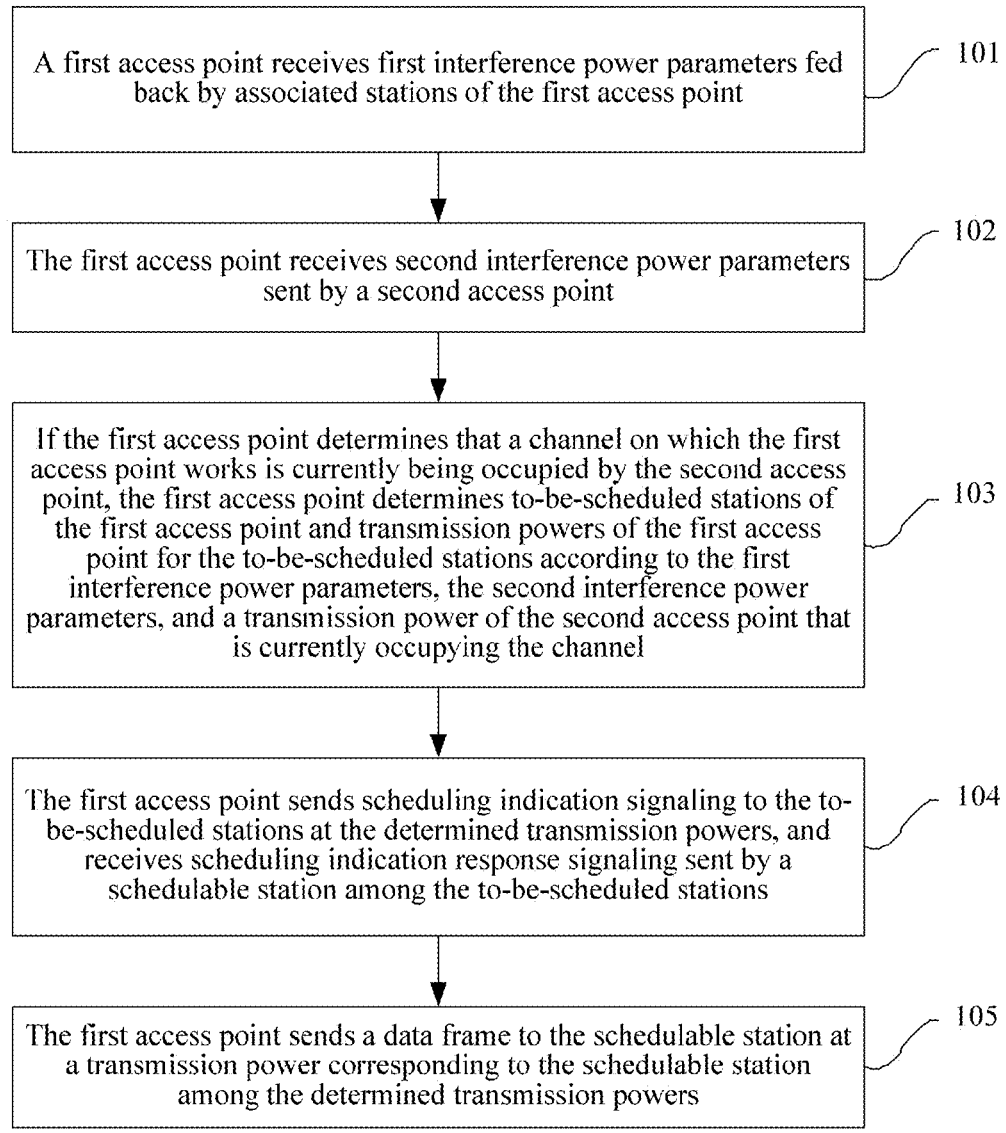
FIG. 1 is a flowchart of a data frame sending method according to an embodiment of the present invention.

FIG. 1 is a flowchart of a data frame sending method according to an embodiment of the present invention. As shown in FIG. 1, the data frame sending method may include:

Step 101: A first access point receives first interference power parameters fed back by associated stations of the first access point.

A coverage area of the first access point overlaps a coverage area of a second access point, the second access point is an adjacent collaborative access point of the first access point, and the first access point is an adjacent collaborative access point of the second access point. The first interference power parameter is used to indicate a transmission power or a transmission power reduction value of the second access point under a condition that communication between the first access point and the associated station of the first access point is not affected.

There may be at least one associated station for the first access point, the second access point includes all access points whose coverage areas overlap the coverage area of the first access point, and a quantity of second access points may be at least one; and each associated station of the first access point feeds back a different first interference power parameter for a second access point that can be measured by the associated station. Therefore, the first interference power parameter fed back by the associated station of the first access point may include at least one first interference power parameter.

In addition, the first access point may further send the first interference power parameter to the second access point.

Step 102: The first access point receives second interference power parameters sent by a second access point.

The second interference power parameters are fed back by associated stations of the second access point to the second access point. The second interference power parameter is used to indicate a transmission power or a transmission power reduction value of the first access point under a condition that communication between the second access point and the associated station of the second access point is not affected.

Similarly, there may be at least one associated station for the second access point, the first access point includes all access points whose coverage areas overlap the coverage area of the second access point, and a quantity of first access points may be at least one; and each associated station of the second access point feeds back a different second interference power parameter for a first access point that can be measured by the associated station. Therefore, the second interference power parameter fed back by the associated station of the second access point may include at least one second interference power parameter.

Step 103: If the first access point determines that a channel on which the first access point works is currently being occupied by the second access point, the first access point determines to-be-scheduled stations of the first access point and transmission powers of the first access point for the to-be-scheduled stations according to the first interference power parameters, the second interference power parameters, and a transmission power of the second access point that is currently occupying the channel.

The second access point that is currently occupying the channel may be at least one of all second access points whose coverage areas overlap the coverage area of the first access point.

Step 104: The first access point sends scheduling indication signaling to the to-be-scheduled stations at the determined transmission powers, and receives scheduling indication response signaling sent by a schedulable station among the to-be-scheduled stations.

Both the scheduling indication signaling and the scheduling indication response signaling carry the determined transmission power.

Step 105: The first access point sends a data frame to the schedulable station at a transmission power corresponding to the schedulable station among the determined transmission powers.

In step 103, that the first access point determines that a channel on which the first access point works is currently being occupied by the second access point may be: if the first access point receives the scheduling indication signaling by listening on the channel on which the first access point works, and the first access point determines that a transmission address carried in the received scheduling indication signaling is an address of the second access point, the first access point determines that the channel is currently being occupied by the second access point; or, if the first access point receives the scheduling indication response signaling by listening on the channel on which the first access point works, and the first access point determines that a receive address carried in the received scheduling indication response signaling is an address of the second access point, the first access point determines that the channel is currently being occupied by the second access point.

It should be noted that, if the channel on which the first access point works is currently being occupied by at least one second access point, the first access point may receive at least one piece of scheduling indication signaling or at least one piece of scheduling indication response signaling by listening on the channel on which the first access point works.

In an implementation manner of this embodiment, the first interference power parameter includes a harmless transmission power upper limit of the second access point, where the harmless transmission power upper limit of the second access point is an allowed maximum transmission power of the second access point under the condition that communication between the first access point and the associated station of the first access point is not affected; and the second interference power parameter includes a harmless transmission power upper limit of the first access point, where the harmless transmission power upper limit of the first access point is an allowed maximum transmission power of the first access point under the condition that communication between the second access point and the associated station of the second access point is not affected.

A harmless transmission power of the second access point is an allowed transmission power of the second access point under the condition that communication between the first access point and the associated station of the first access point is not affected; and a harmless transmission power of the first access point is an allowed transmission power of the first access point under the condition that communication between the second access point and the associated station of the second access point is not affected.

In this case, the second access point is the second access point that is currently occupying the channel on which the first access point works, and the associated station of the second access point is a station, among the associated stations of the second access point that is currently occupying the channel, that is communicating with the second access point that is currently occupying the channel; in step 103, that the first access point determines to-be-scheduled stations of the first access point and transmission powers of the first access point for the to-be-scheduled stations according to the first interference power parameters, the second interference power parameters, and a transmission power of the second access point that is currently occupying the channel may be: the first access point selects the to-be-scheduled stations from the associated stations of the first access point, where a transmission power required by the to-be-scheduled station is less than the second interference power parameter, and the transmission power of the second access point is less than a third interference power parameter, where the third interference power parameter is at least one of the first interference power parameters and is used to indicate a transmission power of the second access point under a condition that communication between the first access point and the to-be-scheduled station is not affected; and the first access point determines that the transmission power of the first access point for the to-be-scheduled station is the transmission power required by the to-be-scheduled station. A quantity of second access points that currently occupy the channel may be at least one, and similarly a quantity of stations that are communicating with the second access points that currently occupy the channel may also be at least one; and in addition, there may be at least one to-be-scheduled station selected by the first access point. Therefore, the third interference power parameter may be at least one of the first interference power parameters.

In another implementation manner of this embodiment, the first interference power parameter includes a harmless power reduction value of the second access point, where the harmless power reduction value of the second access point is used to indicate a numerical value by which a maximum transmission power of the second access point needs to be reduced under the condition that communication between the first access point and the associated station of the first access point is not affected; the second interference power parameter includes a harmless power reduction value of the first access point, where the harmless power reduction value of the first access point is used to indicate a numerical value by which a maximum transmission power of the first access point needs to be reduced under the condition that communication between the second access point and the associated station of the second access point is not affected; the second access point is the second access point that is currently occupying the channel on which the first access point works, and the associated station of the second access point is a station, among the associated stations of the second access point that is currently occupying the channel, that is communicating with the second access point that is currently occupying the channel; therefore in step 103, that the first access point determines to-be-scheduled stations of the first access point and transmission powers of the first access point for the to-be-scheduled stations according to the first interference power parameters, the second interference power parameters, and a transmission power of the second access point that is currently occupying the channel may be: the first access point uses a difference between the maximum transmission power of the second access point and the first interference power parameter as a harmless transmission power upper limit of the second access point, and uses a difference between the maximum transmission power of the first access point and the second interference power parameter as a harmless transmission power upper limit of the first access point, where the harmless transmission power upper limit of the second access point is an allowed maximum transmission power of the second access point under the condition that communication between the first access point and the associated station of the first access point is not affected, and the harmless transmission power upper limit of the first access point is an allowed maximum transmission power of the first access point under the condition that communication between the second access point and the associated station of the second access point is not affected.

Then, the first access point selects the to-be-scheduled stations from the associated stations of the first access point, where a transmission power required by the to-be-scheduled station is less than a harmless transmission power upper limit of the first access point for the associated station of the second access point, and the transmission power of the second access point is less than a harmless transmission power upper limit of the second access point for the to-be-scheduled station; and the first access point determines that the transmission power of the first access point for the to-be-scheduled station is the transmission power required by the to-be-scheduled station. The quantity of the second access points that currently occupy the channel may be at least one, and similarly the quantity of the stations that are communicating with the second access points that currently occupy the channel may also be at least one.

In step 104 in this embodiment, the sending scheduling indication signaling to the to-be-scheduled stations may be: when the to-be-scheduled stations include at least two stations, the first access point may send the scheduling indication signaling to each station of the at least two stations in turn, or the first access point may send the scheduling indication signaling to the at least two stations at the same time.

In this embodiment, a frame structure of the scheduling indication signaling or the scheduling indication response signaling includes at least one of a frame control field, a receive address field, a transmission address field and a transmission power field, where different values of the frame control field indicate that a frame with the frame structure is scheduling indication signaling or scheduling indication response signaling, and a value of the transmission power field is the transmission power determined in step 103.

In the embodiment, a first access point receives first interference power parameters fed back by associated stations of the first access point, and receives second interference power parameters sent by a second access point; if the first access point determines that a channel on which the first access point works is currently being occupied by the second access point, the first access point determines to-be-scheduled stations of the first access point and transmission powers of the first access point for the to-be-scheduled stations according to the first interference power parameters, the second interference power parameters, and a transmission power of the second access point that is currently occupying the channel; finally, the first access point sends scheduling indication signaling to the to-be-scheduled stations at the determined transmission powers, and receives scheduling indication response signaling sent by a schedulable station among the to-be-scheduled stations; and after receiving the scheduling indication response signaling, the first access point sends a data frame to the schedulable station at a transmission power corresponding to the schedulable station among the determined transmission powers. In this way, multiple access points located in a mutual effect area of the access points can perform downlink transmission at the same time, thereby improving utilization of network spectrum resources, and in this embodiment, the determined transmission power is carried in air-interface scheduling indication signaling and scheduling indication response signaling, without the need of additional signaling overheads, and ensuring real-time power control. In addition, this embodiment is based on autonomous distributed behaviors of the access points, and therefore a central scheduler is unneeded.

Figure 2:
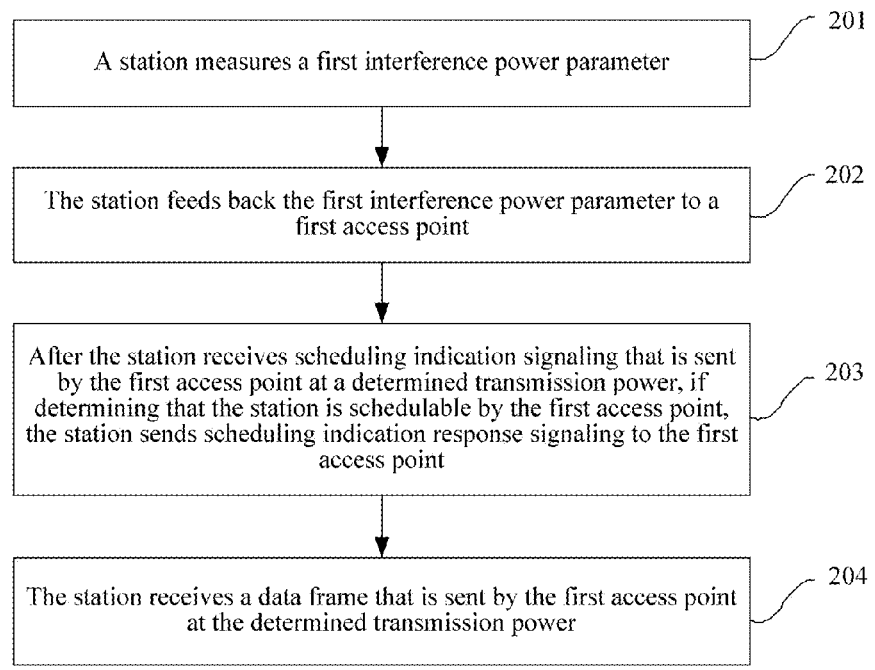
FIG. 2 is a flowchart of a data frame receiving method according to an embodiment of the present invention.

FIG. 2 is a flowchart of a data frame receiving method according to an embodiment of the present invention. As shown in FIG. 2, the data frame receiving method may include:

Step 201: A station measures a first interference power parameter.

The first interference power parameter is used to indicate a transmission power or a transmission power reduction value of a second access point under a condition that communication between the first access point and the station is not affected; the first access point is an associated access point of the station, and a coverage area of the first access point overlaps a coverage area of the second access point; and the second access point is an adjacent collaborative access point of the first access point, and the first access point is an adjacent collaborative access point of the second access point.

Step 202: The station feeds back the first interference power parameter to a first access point, so that when the first access point determines that a channel on which the first access point works is currently being occupied by the second access point, the first access point determines that the station is a to-be-scheduled station of the first access point and a transmission power of the first access point for the station according to the first interference power parameter, a second interference power parameter sent by the second access point, and a transmission power of the second access point that is currently occupying the channel.

The second interference power parameter is used to indicate a transmission power or a transmission power reduction value of the first access point under a condition that communication between the second access point and the associated station of the second access point is not affected.

Step 203: After the station receives scheduling indication signaling that is sent by the first access point at the determined transmission power, if determining that the station is schedulable by the first access point, the station sends scheduling indication response signaling to the first access point.

Both the scheduling indication signaling and the scheduling indication response signaling carry the determined transmission power.

Specifically, that the station determines that the station is schedulable may be: the station determines that a network allocation vector of the station is not set, which may be understood that the network allocation vector of the station is an empty vector or a value of the network allocation vector of the station is 0.

Step 204: The station receives a data frame that is sent by the first access point at the determined transmission power.

In an implementation manner of this embodiment, the interference power parameter includes a harmless transmission power upper limit of the second access point, where the harmless transmission power upper limit of the second access point is an allowed maximum transmission power of the second access point under a condition that communication between the station and the first access point is not affected; and in this case, step 201 may be: the station measures received energy of a signal that is sent by the station to the second access point by using a full power; and then the station determines a harmless power reduction value of the second access point according to the received energy and a clear channel assessment threshold of the station. The harmless power reduction value of the second access point is used to indicate a numerical value by which the maximum transmission power of the second access point needs to be reduced under the condition that communication between the station and the first access point is not affected; and finally, the station uses a difference between the maximum transmission power of the second access point and the harmless power reduction value as the harmless transmission power upper limit of the second access point.

In another implementation manner of this embodiment, the interference power parameter includes a harmless power reduction value of the second access point, where the harmless power reduction value of the second access point is used to indicate a numerical value by which the maximum transmission power of the second access point needs to be reduced under the condition that communication between the station and the first access point is not affected; and in this case, step 201 may be: the station measures received energy of a signal that is sent by the station to the second access point by using a full power; and then the station determines a harmless power reduction value of the second access point according to the received energy and a clear channel assessment threshold of the station.

In the embodiment, after a station measures a first interference power parameter, the station feeds back the first interference power parameter to a first access point, so that when the first access point determines that a channel on which the first access point works is currently being occupied by a second access point, the first access point determines that the station is a to-be-scheduled station of the first access point and a transmission power of the first access point for the station according to the first interference power parameter, a second interference power parameter sent by the second access point, and a transmission power of the second access point that is currently occupying the channel. Then, after the station receives scheduling indication signaling that is sent by the first access point at the determined transmission power, if the station determines that the station is schedulable by the first access point, the station sends scheduling indication response signaling to the first access point; and finally, the station receives a data frame that is sent by the first access point at the determined transmission power. In this way, multiple access points located in a mutual effect area of the access points can perform downlink transmission at the same time, thereby improving utilization of network spectrum resources, and in this embodiment, the determined transmission power is carried in air-interface scheduling indication signaling and scheduling indication response signaling, without the need of additional signaling overheads, and ensuring real-time power control. In addition, this embodiment is based on autonomous distributed behaviors of the access points, and therefore a central scheduler is unneeded.

For example, the present invention may be applied to a scenario of an intensively-deployed distributed autonomous WLAN, that is, a scenario in which an AP schedules an associated station (Station, STA for short below) of the AP, and there is no time-frequency synchronization need between APs, and a downlink capacity of the WLAN network is increased by allowing multiple APs located in a mutual effect area of the APs to communicate concurrently. In addition, a condition of coexisting with a legacy (Legacy) system is satisfied.

The present invention dynamically controls a transmission power of an AP, so that the APs located in the mutual effect area of the APs can communicate concurrently when a condition of a carrier sensing multiple access/collision avoidance (Carrier Sensing Multiple Access/Collision Avoidance, CSMA/CA for short below) mechanism is satisfied.

The present invention mainly targets at a scenario of an enterprise network or a WLAN with unified planning and deployment by an operator. In the scenario, coverage areas of base station subsystems (Base Station Subsystem, BSS for short below) overlap to form an overlapped basic service set (Overlapped Basic Service Set, OBSS for short below), so as to ensure seamless coverage over a service area. Different APs need to determine respective maximum transmission powers by means of static configuration, so that the APs do not interfere with each other. The foregoing scenario is only a preferred deployment scenario of the present invention, and the present invention does not limit applicable scenarios of the methods provided in the embodiments shown in FIG. 1 and FIG. 2 of the present invention. For example, the methods provided in the embodiments shown in FIG. 1 and FIG. 2 of the present invention may also be applied to a scenario in which APs can detect each other by means of listening.

Figure 3:
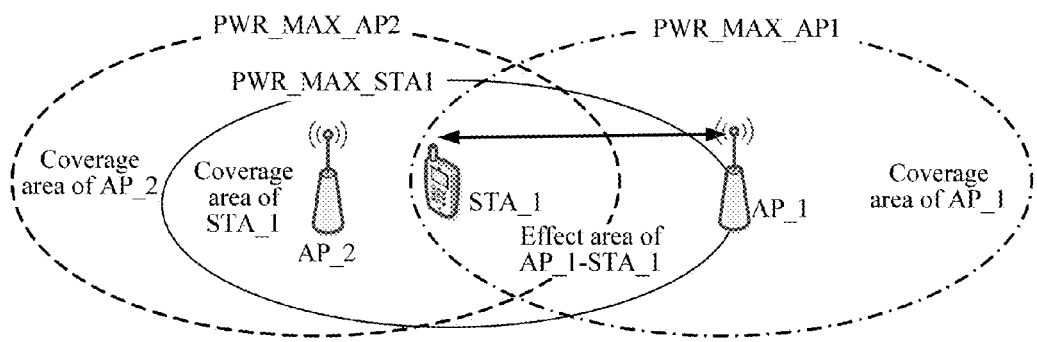
FIG. 3 is a schematic diagram of an AP deployment scenario according to an embodiment of the present invention.

FIG. 3 is a schematic diagram of an AP deployment scenario according to an embodiment of the present invention. In FIG. 3, PWR_MAX_AP1 and PWR_MAX_AP2 indicate respective maximum transmission powers of AP1 and AP2, where a dashed-line ellipse indicates a coverage area of AP_2, a dash-dot-line ellipse indicates a coverage area of AP_1, a solid-line ellipse indicates a coverage area of STA_1, and PWR is an abbreviation of power (Power). A coverage area of AP_X is an area in which, when AP_X communicates with an associated STA of AP_X, signals of AP_X and the associated STA of AP_X can be received, and the area is jointly decided by a transmission power of the AP and a transmission power of the associated STA of the AP. In FIG. 3, a union set of the dash-dot-line ellipse and the solid-line ellipse is an area affected by communication between AP_1 and STA_1.

In the present invention, an STA feeds back, to an associated AP of the STA, interference received by the STA from an adjacent collaborative AP, and estimates a harmless transmission power upper limit (when the adjacent collaborative AP performs transmission at this power, a target STA does not receive interference) of the adjacent collaborative AP. An AP exchanges interference from an adjacent collaborative AP that is fed back by an associated STA of the AP and received by the associated STA, with an adjacent collaborative AP by using a backhaul (backhaul) or a distribution system (Distribution System, DS for short below), thereby determining associated STAs of which adjacent collaborative APs receive interference from this AP, and determining harmless transmission power upper limits for preventing the interference. Certainly, this embodiment of the present invention is not limited thereto. An AP may also exchange interference received by an associated STA from an adjacent collaborative AP that is fed back by the associated STA of the AP, with an adjacent collaborative AP by using air-interface signaling. The present invention does not limit a manner in which an AP exchanges interference received by an associated STA of the AP with an adjacent collaborative AP.

When an AP in an OBSS area obtains a channel by means of competition and schedules the channel to an STA for communication, the AP that occupies the channel interacts with the target STA by using an air-interface management frame, and transmits a transmission power for this downlink communication to an AP and an STA in an area affected by this communication. All APs in an OBSS regard all APs and STAs that first occupy a channel as primary users (Primary User) of the current channel, and each AP decides, according to transmission power needs of all candidate STAs in this BSS and a status of interference to the primary users of the channel, an STA scheduled by the AP. An STA in the OBSS determines, according to a channel occupation status that is detected by the STA by means of listening, whether to respond to a scheduling request sent by an associated AP of the STA.

The following describes the methods provided in the embodiments shown in FIG. 1 and FIG. 2 of the present invention in detail.

Figure 4:
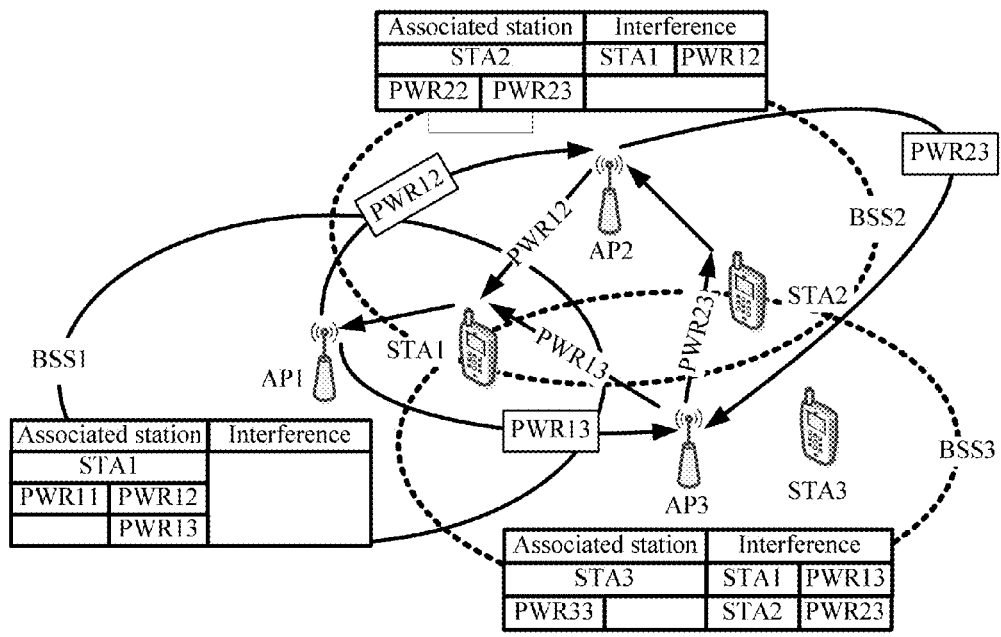
FIG. 4 is a schematic diagram of measurement, feedback and exchange of interference information when three OBSS APs work at the same time according to an embodiment of the present invention.

FIG. 4 is a schematic diagram of measurement, feedback and exchange of interference information when three OBSS APs work at the same time according to an embodiment of the present invention. STA1 is associated with AP1, and STA1 receives downlink interference from AP2 and AP3. STA1 measures received energy of a signal that is sent by STA1 to AP2 and AP3 by using a full power. For example, STA1 measures received energy of a Beacon signal that is sent by STA1 to AP2 and AP3. Then, harmless power reduction values of AP2 and AP3 are determined according to the received energy and a clear channel assessment (Clear Channel Assessment, CCA for short below) threshold of STA1, that is, values by which transmission powers need to be reduced respectively for AP2 and AP3 before STA1 is not interfered with are determined. The harmless power reduction value is denoted by $AP_{XY}$, X indicates a number of a receive STA (in this example, X=1), and Y indicates a number of a transmit AP (in this example, Y=2 or 3).

Specifically, in this embodiment, STA1 can calculate a difference between the received energy and the CCA threshold, as $\Delta P_{XY}$.

In addition, STA1 may determine the maximum transmission powers of AP1 and AP2 according to the Beacon signal that is transmitted by AP2 and AP3, which are denoted by $P_Y$ (in this example, Y=2, 3). STA1 determines the harmless transmission power upper limits of AP2 and AP3 by using a formula (1). (In this example, X=1 and Y=2, 3).

$$PWR_{XY} = P_Y - \Delta P_{XY} \qquad (1)$$

After the measurement, STA1 feeds back the harmless transmission power upper limit $PWR_{XY}$ to AP1 associated with STA1. Similarly, an STA that is in the OBSS and associated with AP2 and AP3 also performs the foregoing measurement and feedback. For example, STA2 associated with AP2 receives interference from AP3, and therefore STA2 feeds back $PWR_{23}$ to AP2 after performing the foregoing measurement. However, STA3 does not receive interference from AP1 or AP2, and therefore STA3 does not feed back any value.

After an AP receives interference feedback from an associated STA, the AP transmits a harmless transmission power upper limit that is of an adjacent collaborative AP and measured by the associated STA to the adjacent collaborative AP by using the backhaul or the DS. As shown in FIG. 4, AP1 transmits $PWR_{12}$ to AP2, and transmits $PWR_{13}$ to AP3; and correspondingly AP2 transmits $PWR_{23}$ to AP3. Each AP maintains a list storing harmless transmission power upper limits of STAs that receive interference from the AP. In FIG. 4, an interference column in each table corresponds to a harmless transmission power upper limit of an STA that receives interference from a corresponding AP.

In addition, in this embodiment, an STA may also measure and feed back only a harmless power reduction value $\Delta P_{XY}$, and an associated AP of the STA determines a harmless transmission power upper limit.

Figure 5:
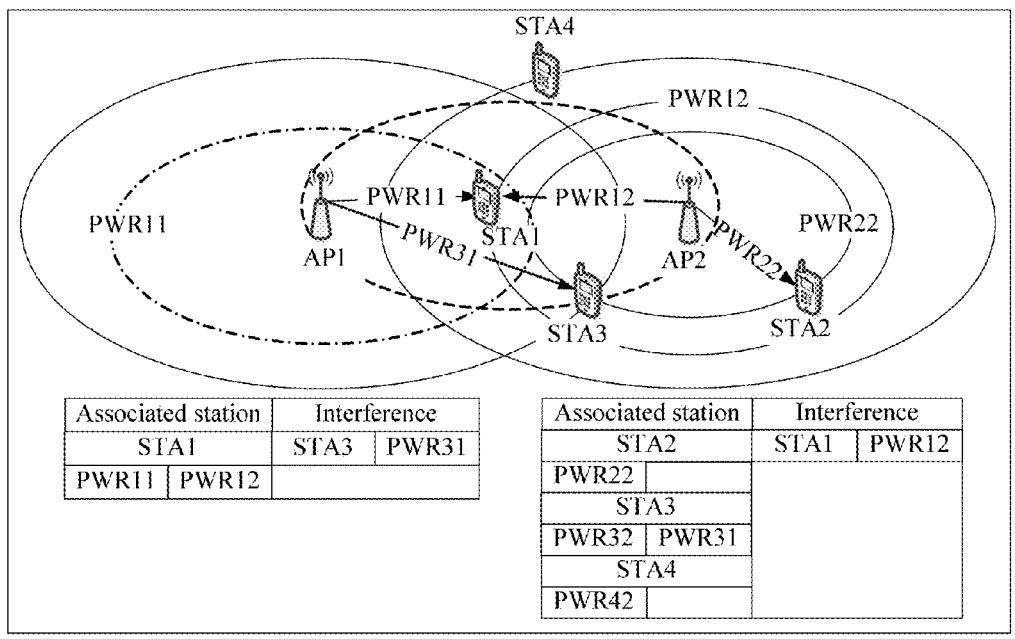
FIG. 5 is a schematic diagram of collaboration between two APs according to an embodiment of the present invention.

FIG. 5 is a schematic diagram of an embodiment of collaboration between two APs according to the present invention. As shown in FIG. 5, AP1 and AP2 may collaborate with each other. In FIG. 5, ranges encircled by solid-line ellipses indicate maximum coverage ranges of AP1 and AP2. STA1 is associated with AP1 and located in an overlapping coverage area of AP1 and AP2, and therefore receives interference from AP2. STA2, STA3 and STA4 are associated with AP2. If STA1 is served, AP1 needs to send a data frame to STA1 at a transmission power $PWR_{11}$. A value of $PWR_{11}$ depends on a service transmission rate need of STA1 and a current state of a radio channel between STA1 and AP1. In this case, a range affected by a transmit signal of AP1 is an area indicated by a dash-dot-line ellipse. Similarly, if STA2 is scheduled by AP2, AP2 needs to perform transmission at $PWR22$; if STA3 is scheduled by AP2, AP2 needs to perform transmission at $PWR32$; and if STA4 is scheduled by AP2, AP2 needs to perform transmission at $PWR42$.

Assuming that AP1 first detects by means of listening that a channel is not used, AP1 sends scheduling indication signaling (Request To Send, RTS for short below) 1 to STA1 at $PWR_{11}$. If in this case STA1 is allowed to perform transmission (that is, a network allocation vector (Network Allocation Vector, NAV for short below) of STA1 is not enabled by another communication), STA1 listens on the channel within a specific duration, for example, a short inter frame space (Short Inter Frame Space, SIFS for short below), after receiving RTS1. When the channel is not occupied, STA1 sends scheduling indication response signaling (Clear To Send, CTS for short below) 1 to AP1 at a full power. In FIG. 5, an area indicated by a dashed-line ellipse is an effect range for STA1 to send a response signal.

AP2 learns by receiving CTS1 fed back by STA1 to AP1 that, after this, AP1 transmits the data frame to STA1 at $PWR_{11}$ within a time T, where a length of T may be carried in RTS1, and specifically the length of T may be a value of a frame duration field in RTS1. An associated STA_X of AP2 is schedulable by AP2 only when the following three conditions are all satisfied:

(1) a transmission power required by the to-be-scheduled STA_X is less than $PWR_{12}$, that is, $PWR_{x2} < PWR_{12}$, and in FIG. 5, both STA2 and STA3 satisfy this condition;

(2) the to-be-scheduled STA_X is not located in an effect range of the current communication of AP1, that is, the to-be-scheduled STA_X is not located in a range indicated by a dash-dot-line ellipse in FIG. 5, that is, $PWR_{11} < PWR_{X1}$, and in FIG. 5, STA2, STA3 and STA4 all satisfy this condition; and (3) the to-be-scheduled STA_X is not located in an uplink coverage range of STA1, that is, the to-be-scheduled STA_X is not located in an area covered by the dashed-line ellipse in FIG. 5, and in FIG. 5, STA2 satisfies this condition.

AP2 may learn the harmless transmission power upper limit $PWR_{12}$ for STA1 and the harmless transmission power upper limit $PWR_{X1}$ of AP1 for an STA associated with AP2 from an interference information list maintained by AP2. If related information about $PWR_{X1}$ does not exist in the interference information list, it indicates that, even if AP1 perform transmission at the full power, the STA associated with AP2 is not interfered with. Therefore, AP2 may select by itself all associated STAs that satisfy the conditions (1) and (2) as to-be-scheduled STAs. In this example, STA2 and STA3 are to-be-scheduled STAs of AP2.

In this case, AP2 cannot learn whether STA2 and STA3 are located in an uplink effect area of STA1, and therefore AP2 needs to send scheduling indication signaling RTS2 and RTS3 to STA2 and STA3 in turn according to a scheduling policy. In this example, AP2 chooses to first send RTS3 to STA3; however, STA3 is located in an uplink effect range of STA1, that is, STA3 receives CTS1 sent by STA1, and the NAV of STA3 is enabled; therefore STA3 cannot send the scheduling indication response signaling CTS3 corresponding to RTS3. If AP2 still cannot receive, after waiting for a specific duration (for example, the SIFS), CTS3 sent by STA3, AP2 sends the scheduling indication signaling RTS2 to STA2 instead. Because STA2 is not affected by STA1, and therefore STA2 feeds back CTS2 to AP2 after a specific duration (for example, the SIFS). AP2 begins to send a data frame to STA2 once AP2 does not detect by means of listening, within a specific duration (for example, the SIFS) after receiving CTS2 fed back by STA2, that a channel on which AP2 works is occupied. AP2 can learn, by using RTS/CTS signaling interworking between STA2 and STA3, whether STA2 and STA3 satisfy the condition (3).

Figures 6, 7:
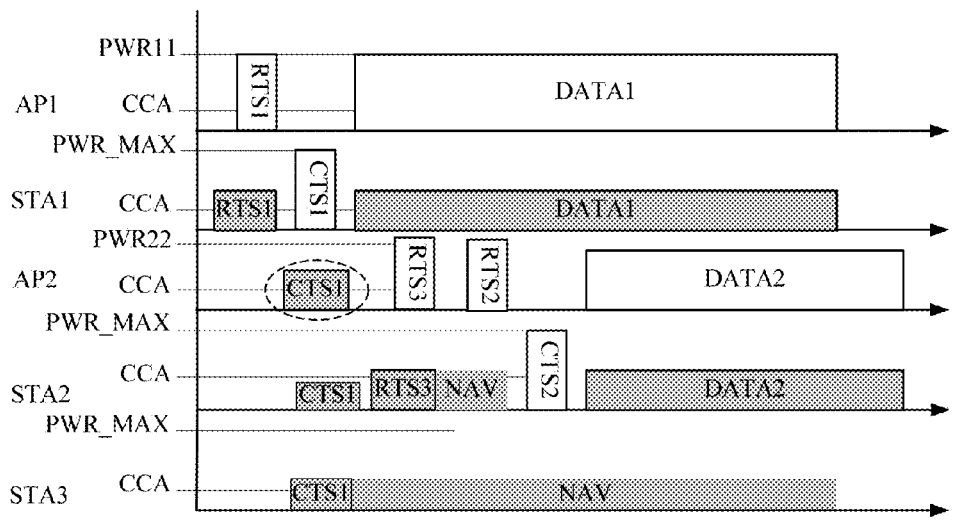
FIG. 6 is a schematic diagram of a signaling interworking process during collaboration between two APs according to an embodiment of the present invention.
FIG. 7 is a schematic diagram of a frame structure of scheduling indication signaling or scheduling indication response signaling according to an embodiment of the present invention.

FIG. 6 is a schematic diagram of a signaling interworking process during collaboration between two APs according to an embodiment of the present invention. In FIG. 6, blank rectangles indicate data packets sent by a transmit end, and shaded rectangles indicate corresponding data packets received at a receive end.

In the present invention, by using scheduling indication signaling and scheduling indication response signaling, an AP and an STA in this BSS occupy a channel resource for subsequent downlink data transmission (which is the same as the RTS/CTS function in the prior-art standard). In addition, an adjacent collaborative AP needs to learn, by means of signaling interworking, an AP and an STA that occupy a channel to perform downlink communication, and a transmission power of the AP. Therefore, the scheduling indication signaling used in the present invention may be implemented by appending a transmission power field to an RTS control frame. In a frame structure of a legacy CTS, there is no transmission address (Transmission address, TA for short below) field; however, a value of the TA field is used to transfer information about a scheduled STA of this cell to the adjacent collaborative AP; therefore, a scheduling indication response signaling may use a frame structure that is the same as that of the scheduling indication signaling, and the scheduling indication and the scheduling indication response are differentiated by using different values of a frame control (Frame Control) field.

FIG. 7 is a schematic diagram of a frame structure of scheduling indication signaling or scheduling indication response signaling according to an embodiment of the present invention.

The frame structure of the scheduling indication signaling or the scheduling indication response signaling may include at least one of a frame control field, a receive address field, a transmission address field and a transmission power field; and in addition, may further include a frame duration (Duration) field and a frame check sequence.

FIG. 7 is shown by using an example in which the frame structure of the scheduling indication signaling or the scheduling indication response signaling includes the frame control field, the frame duration (Duration) field, the receive address field, the transmission address field, the transmission power field and the frame check sequence.

A value of the receive address field may be a Media Access Control (Media Access Control, MAC for short below) address of a receiving party, a value of the transmission address field may be a MAC address of a sending party, and the frame control field, the frame duration (Duration) field, the receive address field and the transmission address field are included in a MAC header of a frame.

A value of the transmission power field is a transmission power of an AP that occupies a channel to perform downlink communication.

A value of the frame duration field in the scheduling indication signaling is used to indicate a channel occupation duration of an AP and an STA that occupy a channel to perform downlink communication, that is, a downlink communication duration of the AP and the STA that occupy the channel to perform downlink communication.

Figure 8:
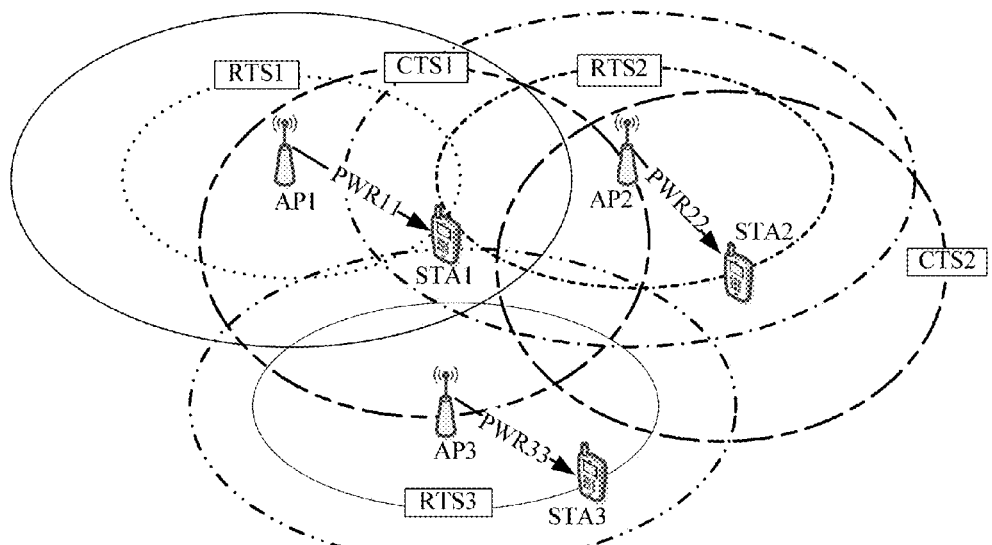
FIG. 8 is a schematic diagram of signal coverage during collaboration between three APs according to an embodiment of the present invention.

FIG. 8 is a schematic diagram of an embodiment of signal coverage during collaboration between three APs according to the present invention. In FIG. 8, coverage areas of AP1, AP2 and AP3 overlap each other, where a range indicated by a solid-line ellipse is the coverage area of AP1, a range indicated by a dash-dot-line ellipse is the coverage area of AP2, and a range indicated by a dash-dot-dot ellipse is the coverage area of AP3. STA1 is associated with AP1, STA2 is associated with AP2, and STA3 is associated with AP3. It is assumed that, AP1 first occupies a channel to perform downlink communication with STA1. In addition, AP2 performs downlink communication with STA2 by using $PWR_{22}$ according to the method provided in the embodiment shown in FIG. 1 of the present invention. For a process in which AP1 and AP2 perform coordinated communication, reference may be made to the embodiments shown in FIG. 5 and FIG. 6 of the present invention. Details are not provided again herein.

In this case, AP3 successively receives CTS1 and CTS2 that are sent by STA1 and STA2 to AP1 and AP2 respectively, and learns transmission powers of AP1 and AP2. In this case, if AP3 needs to perform downlink communication at the same time, conditions that must be satisfied are:

(1) a transmission power of AP3 required by the to-be-scheduled STA3 is less than $PWR_{13}$ and $PWR_{23}$;

(2) the to-be-scheduled STA3 is not located in an effect range of the downlink communication that is being performed by AP1 and AP2, that is, STA3 is not located in ranges indicated by a dotted-line ( · · · · ) ellipse and a dash-dash-dot-line ( -- · -- ) ellipse in FIG. 8; and (3) the to-be-scheduled STA3 is not located in uplink coverage ranges of STA1 and STA2, that is, STA3 is not located in a union set of coverage areas of a two-short-dash-one-long-dash ( —--- ) ellipse and a one-long-dash-one-short-dash ( —--- )ellipse in FIG. 8.

In FIG. 8, STA3 satisfies the foregoing conditions. Therefore AP3 sends RTS3 to STA3, and STA3 feeds back CTS3 (which is not shown in FIG. 8) to AP3 after a specific duration (for example, an SIFS). AP3 begins to send a data frame to STA3 if AP3 does not detect by means of listening, within a specific duration (for example, the SIFS) after receiving CTS3 fed back by STA3, that a channel on which AP3 works is occupied.

Figure 9:
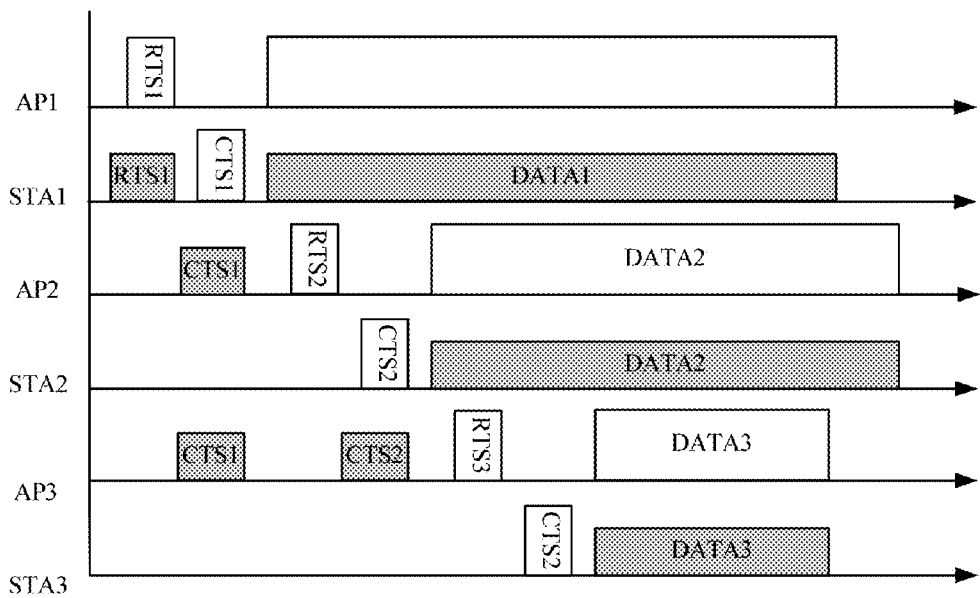
FIG. 9 is a schematic diagram of signaling interworking during collaboration between three APs according to an embodiment of the present invention.

FIG. 9 is a schematic diagram of signaling interworking during collaboration between three APs according to an embodiment of the present invention. In FIG. 9, blank rectangles indicate data packets sent by a transmit end, and shaded rectangles indicate corresponding data packets received at a receive end.

Figure 10:
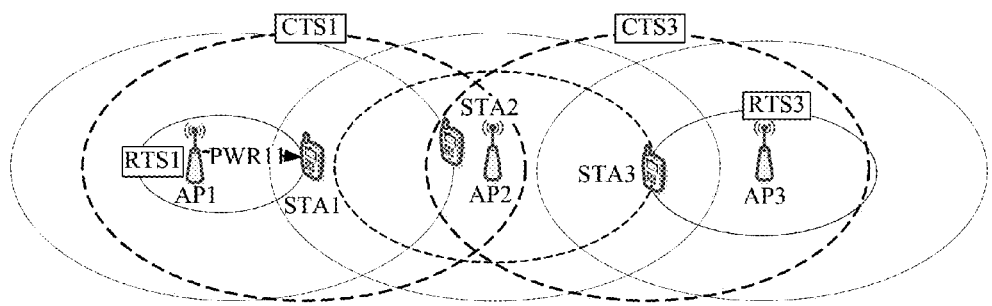
FIG. 10 is a schematic diagram of a linear BSS deployment scenario according to an embodiment of the present invention.

FIG. 10 is a schematic diagram of a linear BSS deployment scenario according to an embodiment of the present invention. In the scenario shown in FIG. 10, BSSs located at two ends that are served by AP1 and AP3 do not overlap each other, and therefore transmission and reception of the BSSs are independent from each other. A BSS served by AP2 receives joint interference from AP1, AP3 and associated STAs of AP1 and AP3. It is assumed that, AP1 first obtains a channel use right by means of competition, and sends scheduling indication signaling RTS1 to STA1 at $PWR_{11}$. After a specific duration, STA1 feeds back scheduling indication response signaling CTS1 to AP1 at a full power, and then performs downlink data transmission. In addition, AP3 and an associated station STA3 of AP3 cannot listen on transmission between AP1 and STA1, and AP3 and STA3 perform channel competition according to a time sequence of this BSS.

Figure 11:
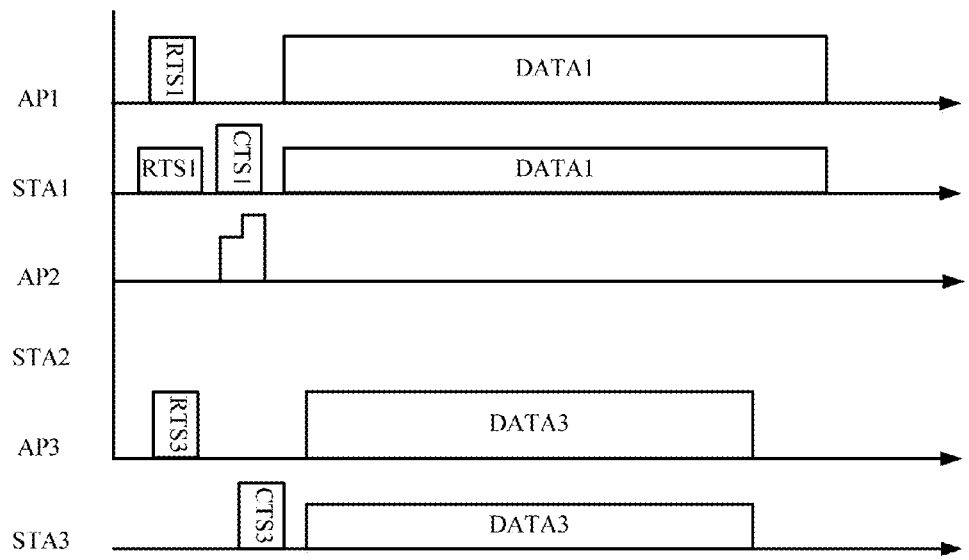
FIG. 11 is a schematic diagram of signaling interworking during collaboration between three APs with nodes hidden according to an embodiment of the present invention.

In this way, a scenario shown in FIG. 11 is true. FIG. 11 is a schematic diagram of signaling interworking during collaboration between three APs with nodes hidden according to an embodiment of the present invention. RTS1 and RTS3 that are sent by AP3 and AP1 overlap in time. STA1 and STA3 that are associated with AP1 and AP3 respectively are relatively far from each other; and therefore are not affected, and send CTS1 and CTS3 according to an inherent time sequence. At a receive end of AP2, powers of signals from STA1 and STA3 are close, and overlap in time; therefore, only that a channel is occupied can be determined by means of energy detection, but information included in CTS cannot be obtained by means of demodulation. In this case, AP2 should treat AP1 and AP3 as non-collaborative APs, but stays at a channel listening state, until AP1 or AP3 completes transmission, or AP2 can obtain, by means of demodulation, scheduling indication signaling (RTS) and scheduling indication response signaling (CTS) that are from interaction in a BSS served by AP1 or AP3.

In the present invention, multiple APs located in a mutual effect area of the APs can perform downlink transmission at the same time, thereby improving utilization of network spectrum resources. In addition, in the present invention, only some slowly changing semi-static power parameters need to be exchanged by using a Backhaul; therefore requirements on a bandwidth and a time delay of the Backhaul are very low, and generally a DS based on the Internet (Internet) can support transmission. In the present invention, power control information is carried by using air-interface scheduling indication signaling and scheduling indication response signaling, without the need of additional signaling overheads, thereby ensuring real-time power control. The present invention is based on autonomous distributed behaviors of the APs, and therefore a central scheduler is unneeded.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Figure 12:
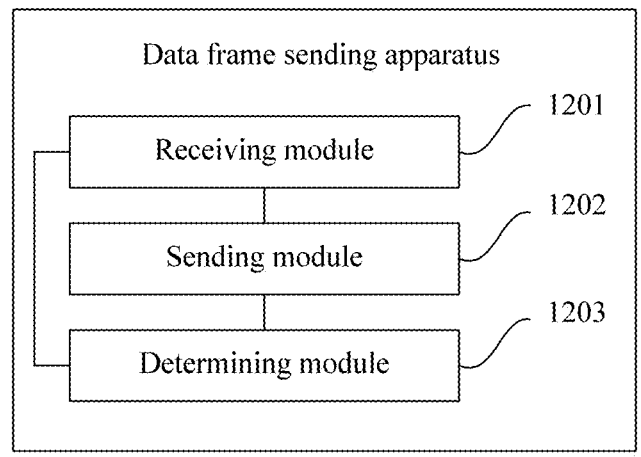
FIG. 12 is a schematic structural diagram of a data frame sending apparatus according to an embodiment of the present invention.

FIG. 12 is a schematic structural diagram of a data frame sending apparatus according to an embodiment of the present invention. The data frame sending apparatus in this embodiment may be configured in a first access point, to implement the method in the embodiment shown in FIG. 1 of the present invention. As shown in FIG. 12, the data frame sending apparatus may include: a receiving module 1201, a sending module 1202 and a determining module 1203, where the receiving module 1201 is configured to receive first interference power parameters fed back by associated stations of the first access point, and receive second interference power parameters sent by a second access point, where the second interference power parameters are fed back by associated stations of the second access point to the second access point; where a coverage area of the first access point overlaps a coverage area of the second access point;

and the first interference power parameter is used to indicate a transmission power or a transmission power reduction value of the second access point under a condition that communication between the first access point and the associated station of the first access point is not affected, and the second interference power parameter is used to indicate a transmission power or a transmission power reduction value of the first access point under a condition that communication between the second access point and the associated station of the second access point is not affected;

the determining module 1203 is configured to determine that a channel on which the first access point works is currently being occupied by the second access point, and determine to-be-scheduled stations of the first access point and transmission powers of the first access point for the to-be-scheduled stations according to the first interference power parameters, the second interference power parameters, and a transmission power of the second access point that is currently occupying the channel;

the sending module 1202 is configured to send scheduling indication signaling to the to-be-scheduled stations at the transmission powers determined by the determining module 1203, and after the receiving module 1201 receives scheduling indication response signaling sent by a schedulable station among the to-be-scheduled stations, send a data frame to the schedulable station at a transmission power corresponding to the schedulable station among the transmission powers determined by the determining module 1203; and the receiving module 1201 is further configured to: after the sending module 1202 sends the scheduling indication signaling, receive the scheduling indication response signaling sent by the schedulable station among the to-be-scheduled stations, where both the scheduling indication signaling and the scheduling indication response signaling carry the transmission power determined by the determining module 1203.

The determining module 1203 being configured to determine that a channel on which the first access point works is currently being occupied by the second access point may be: the determining module 1203 being specifically configured to: when receiving the scheduling indication signaling by listening on the channel on which the first access point works, and determining that a transmission address carried in the received scheduling indication signaling is an address of the second access point, determine that the channel is currently being occupied by the second access point; or, when receiving the scheduling indication response signaling by listening on the channel on which the first access point works, and determining that a receive address carried in the received scheduling indication response signaling is an address of the second access point, determine that the channel is currently being occupied by the second access point.

In an implementation manner of this embodiment, the first interference power parameter received by the receiving module 1201 includes a harmless transmission power upper limit of the second access point, where the harmless transmission power upper limit of the second access point is an allowed maximum transmission power of the second access point under the condition that communication between the first access point and the associated station of the first access point is not affected; and the second interference power parameter received by the receiving module 1201 includes a harmless transmission power upper limit of the first access point, where the harmless transmission power upper limit of the first access point is an allowed maximum transmission power of the first access point under the condition that communication between the second access point and the associated station of the second access point is not affected.

In this implementation manner, the second access point is the second access point that is currently occupying the channel, and the associated station of the second access point is a station, among the associated stations of the second access point that is currently occupying the channel, that is communicating with the second access point that is currently occupying the channel; in this case, the determining module 1203 being configured to determine to-be-scheduled stations of the first access point and transmission powers of the first access point for the to-be-scheduled stations according to the first interference power parameters, the second interference power parameters, and a transmission power of the second access point that is currently occupying the channel may be: the determining module 1203 being configured to select the to-be-scheduled stations from the associated stations of the first access point, where a transmission power required by the to-be-scheduled station is less than the second interference power parameter, and the transmission power of the second access point is less than a third interference power parameter; and determine that the transmission power of the first access point for the to-be-scheduled station is the transmission power required by the to-be-scheduled station, where the third interference power parameter is at least one of the first interference power parameters and is used to indicate a transmission power of the second access point under a condition that communication between the first access point and the to-be-scheduled station is not affected. The quantity of the second access points that currently occupy the channel may be at least one, and similarly the quantity of the stations that are communicating with the second access points that currently occupy the channel may also be at least one.

In another implementation manner of this embodiment, the first interference power parameter received by the receiving module 1201 includes a harmless power reduction value of the second access point, where the harmless power reduction value of the second access point is used to indicate a numerical value by which a maximum transmission power of the second access point needs to be reduced under the condition that communication between the first access point and the associated station of the first access point is not affected; the second interference power parameter received by the receiving module 1201 includes a harmless power reduction value of the first access point, where the harmless power reduction value of the first access point is used to indicate a numerical value by which a maximum transmission power of the first access point needs to be reduced under the condition that communication between the second access point and the associated station of the second access point is not affected; the second access point is the second access point that is currently occupying the channel on which the first access point works; and the associated station of the second access point is a station, among the associated stations of the second access point that is currently occupying the channel, that is communicating with the second access point that is currently occupying the channel.

In this case, the determining module 1203 being configured to determine to-be-scheduled stations of the first access point and transmission powers of the first access point for the to-be-scheduled stations according to the first interference power parameters, the second interference power parameters, and a transmission power of the second access point that is currently occupying the channel may be: the determining module 1203 being specifically configured to use a difference between the maximum transmission power of the second access point and the first interference power parameter as a harmless transmission power upper limit of the second access point, and use a difference between the maximum transmission power of the first access point and the second interference power parameter as a harmless transmission power upper limit of the first access point; select the to-be-scheduled stations from the associated stations of the first access point, where a transmission power required by the to-be-scheduled station is less than a harmless transmission power upper limit of the first access point for the associated station of the second access point, and the transmission power of the second access point is less than a harmless transmission power upper limit of the second access point for the to-be-scheduled station; and determine that the transmission power of the first access point for the to-be-scheduled station is the transmission power required by the to-be-scheduled station. The quantity of the second access points that currently occupy the channel may be at least one, and similarly the quantity of the stations that are communicating with the second access points that currently occupy the channel may also be at least one.

In this embodiment, the sending module 1202 being configured to send scheduling indication signaling to the to-be-scheduled stations may be: the sending module 1202 being specifically configured to: when the to-be-scheduled stations include at least two stations, send the scheduling indication signaling to each station of the at least two stations in turn, or send the scheduling indication signaling to the at least two stations at the same time.

In this embodiment, a frame structure of the scheduling indication signaling or the scheduling indication response signaling may include at least one of a frame control field, a receive address field, a transmission address field and a transmission power field, where different values of the frame control field indicate that a frame with the frame structure is scheduling indication signaling or scheduling indication response signaling, and a value of the transmission power field is the determined transmission power. The frame structure of the scheduling indication signaling or the scheduling indication response signaling may be shown in FIG. 7. Details are not provided again herein.

In the embodiment, a receiving module 1201 receives a first interference power parameter fed back by an associated station of the first access point, and receives a second interference power parameter sent by a second access point; if determining that a channel on which the first access point works is currently being occupied by the second access point, a determining module 1203 determines to-be-scheduled stations of the first access point and transmission powers of the first access point for the to-be-scheduled stations according to the first interference power parameters, the second interference power parameters, and a transmission power of the second access point that is currently occupying the channel; finally, a sending module 1202 sends scheduling indication signaling to the to-be-scheduled stations at the transmission powers determined by the determining module 1203, and the receiving module 1201 receives scheduling indication response signaling sent by a schedulable station among the to-be-scheduled stations; and after receiving the scheduling indication response signaling, the sending module 1202 sends a data frame to the schedulable station at a transmission power corresponding to the schedulable station among the determined transmission powers. In this way, multiple access points located in a mutual effect area of the access points can perform downlink transmission at the same time, thereby improving utilization of network spectrum resources, and in this embodiment, the determined transmission power is carried in air-interface scheduling indication signaling and scheduling indication response signaling, without the need of additional signaling overheads, and ensuring real-time power control. In addition, this embodiment is based on autonomous distributed behaviors of the access points, and therefore a central scheduler is unneeded.

Figure 13:
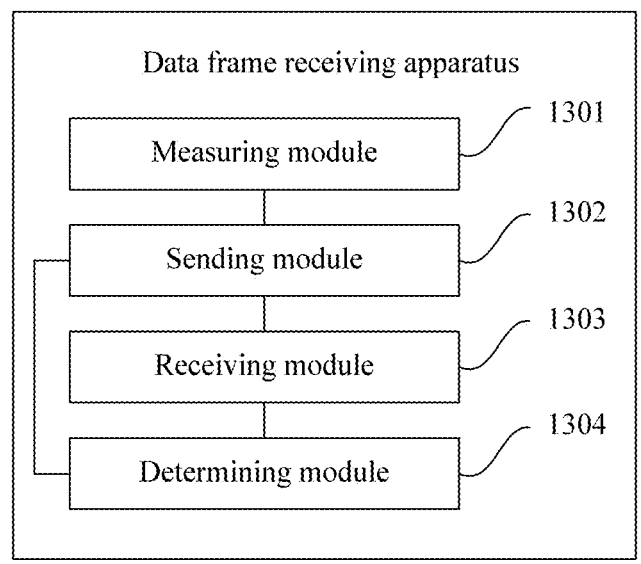
FIG. 13 is a schematic structural diagram of a data frame receiving apparatus according to an embodiment of the present invention.

FIG. 13 is a schematic structural diagram of a data frame receiving apparatus according to an embodiment of the present invention. The data frame receiving apparatus in this embodiment may be configured in a station, to implement the process in the embodiment shown in FIG. 2 of the present invention. As shown in FIG. 13, the data frame receiving apparatus may include: a measuring module 1301, a sending module 1302, a receiving module 1303 and a determining module 1304, where the measuring module 1301 is configured to measure a first interference power parameter, where the first interference power parameter is used to indicate a transmission power or a transmission power reduction value of a second access point under a condition that communication between a first access point and the station is not affected, where the first access point is an associated access point of the station, and a coverage area of the first access point overlaps a coverage area of the second access point;

the sending module 1302 is configured to feed back the first interference power parameter measured by the measuring module 1301 to the first access point, so that when the first access point determines that a channel on which the first access point works is currently being occupied by the second access point, the first access point determines, according to the first interference power parameter, a second interference power parameter that is sent by the second access point and a transmission power of the second access point that is currently occupying the channel, that the station is a to-be-scheduled station of the first access point, and a transmission power of the first access point for the station, where the second interference power parameter is used to indicate a transmission power or a transmission power reduction value of the first access point under a condition that communication between the second access point and an associated station of the second access point is not affected;

the receiving module 1303 is configured to receive scheduling indication signaling that is sent by the first access point at the determined transmission power;

the determining module 1304 is configured to: after the receiving module 1303 receives the scheduling indication signaling, determine that the station is schedulable by the first access point;

the sending module 1302 is further configured to: after the determining module 1304 determines that the station is schedulable by the first access point, send scheduling indication response signaling to the first access point, where both the scheduling indication signaling and the scheduling indication response signaling carry the determined transmission power; and the receiving module 1303 is further configured to: after the sending module 1302 sends the scheduling indication response signaling, receive a data frame that is sent by the first access point at the determined transmission power.

In an implementation manner of this embodiment, the first interference power parameter measured by the measuring module 1301 includes a harmless transmission power upper limit of the second access point, where the harmless transmission power upper limit of the second access point is an allowed maximum transmission power of the second access point under the condition that communication between the station and the first access point is not affected; and the measuring module 1301 is specifically configured to measure received energy of a signal that is sent by the station to the second access point by using a full power; determine a harmless power reduction value of the second access point according to the received energy and a clear channel assessment threshold of the station; and use a difference between the maximum transmission power of the second access point and the harmless power reduction value as the harmless transmission power upper limit of the second access point.

In another implementation manner of this embodiment, the first interference power parameter measured by the measuring module 1301 includes a harmless power reduction value of the second access point, where the harmless power reduction value of the second access point is used to indicate a numerical value by which the maximum transmission power of the second access point needs to be reduced under the condition that communication between the station and the first access point is not affected; and the measuring module 1301 is specifically configured to measure received energy of a signal that is sent by the station to the second access point by using a full power; and determine the harmless power reduction value of the second access point according to the received energy and a clear channel assessment threshold of the station.

In the embodiment, after a measuring module 1301 measures a first interference power parameter, a sending module 1302 feeds back the first interference power parameter to a first access point of a station, so that when the first access point determines that a channel on which the first access point works is currently being occupied by a second access point, the first access point determines that the station is a to-be-scheduled station of the first access point and a transmission power of the first access point for the station according to the first interference power parameter, a second interference power parameter sent by the second access point, and a transmission power of the second access point that is currently occupying the channel. Then, after a receiving module 1303 receives scheduling indication signaling that is sent by the first access point at the determined transmission power, if a network allocation vector of the station is not enabled, a determining module 1304 determines that the station is schedulable, the sending module 1302 sends scheduling indication response signaling to the first access point, and finally the receiving module 1303 receives a data frame sent by the first access point at a transmission power corresponding to the schedulable station of the determined transmission power. In this way, multiple access points located in a mutual effect area of the access points can other perform downlink transmission at the same time, thereby improving utilization of network spectrum resources, and in this embodiment, the determined transmission power is carried in air-interface scheduling indication signaling and scheduling indication response signaling, without the need of additional signaling overheads, and ensuring real-time power control. In addition, this embodiment is based on autonomous distributed behaviors of the access points, and therefore a central scheduler is unneeded.

Figure 14:
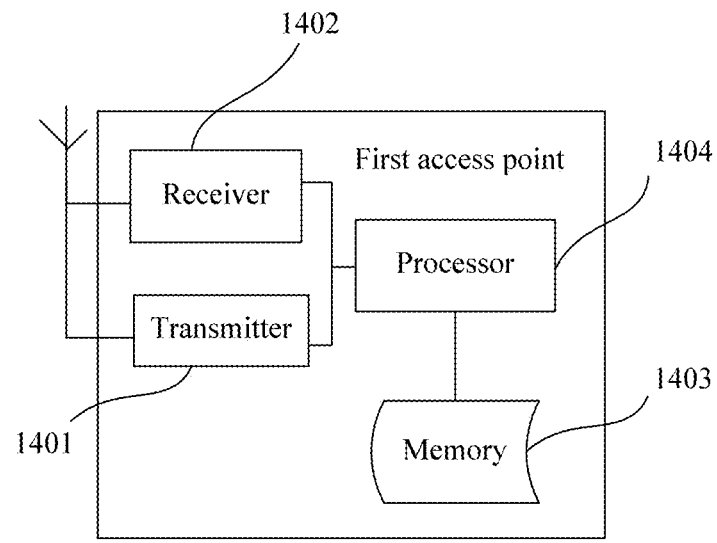
FIG. 14 is a schematic structural diagram of a first access point according to an embodiment of the present invention.

FIG. 14 is a schematic structural diagram of a first access point according to an embodiment of the present invention. The first access point in this embodiment can implement the process in the embodiment shown in FIG. 1 of the present invention. As shown in FIG. 14, the first access point may include: a transmitter 1401, a receiver 1402, a memory 1403 and a processor 1404 that is separately connected to the transmitter 1401, the receiver 1402 and the memory 1403.

Certainly, the first access point may further include generic parts such as an antenna and an input/output apparatus, which are not limited herein in this embodiment of the present invention.

The receiver 1402 is configured to receive first interference power parameters fed back by associated stations of the first access point, and receive second interference power parameters sent by a second access point, where the second interference power parameters are fed back by associated stations of the second access point to the second access point; where a coverage area of the first access point overlaps a coverage area of the second access point, the first interference power parameter is used to indicate a transmission power or a transmission power reduction value of the second access point under a condition that communication between the first access point and the associated station of the first access point is not affected, and the second interference power parameter is used to indicate a transmission power or a transmission power reduction value of the first access point under a condition that communication between the second access point and the associated station of the second access point is not affected;

the memory 1403 is configured to store a group of program code;

the processor 1404 is configured to invoke the program code stored in the memory 1403, to determine that a channel on which the first access point works is currently being occupied by the second access point, and determine to-be-scheduled stations of the first access point and transmission powers of the first access point for the to-be-scheduled stations according to the first interference power parameters, the second interference power parameters, and a transmission power of the second access point that is currently occupying the channel;

the transmitter 1401 is configured to send scheduling indication signaling to the to-be-scheduled stations at the transmission powers determined by the processor 1404, and after the receiver 1402 receives scheduling indication response signaling sent by a schedulable station among the to-be-scheduled stations, send a data frame to the schedulable station at a transmission power corresponding to the schedulable station among the transmission powers determined by the processor 1404; and the receiver 1402 is further configured to: after the transmitter 1401 sends the scheduling indication signaling, receive the scheduling indication response signaling sent by the schedulable station among the to-be-scheduled stations, where both the scheduling indication signaling and the scheduling indication response signaling carry the transmission power determined by the determining module 1203.

The processor 1404 being configured to determine that a channel on which the first access point works is currently being occupied by the second access point may be: the processor 1404 being specifically configured to: when receiving the scheduling indication signaling by listening on the channel on which the first access point works, and determining that a transmission address carried in the received scheduling indication signaling is an address of the second access point, determine that the channel is currently being occupied by the second access point; or, when receiving the scheduling indication response signaling by listening on the channel on which the first access point works, and determining that a receive address carried in the received scheduling indication response signaling is an address of the second access point, determine that the channel is currently being occupied by the second access point.

In an implementation manner of this embodiment, the first interference power parameter received by the receiver 1402 includes a harmless transmission power upper limit of the second access point, where the harmless transmission power upper limit of the second access point is an allowed maximum transmission power of the second access point under the condition that communication between the first access point and the associated station of the first access point is not affected; and the second interference power parameter received by the receiver 1402 includes a harmless transmission power upper limit of the first access point, where the harmless transmission power upper limit of the first access point is an allowed maximum transmission power of the first access point under the condition that communication between the second access point and the associated station of the second access point is not affected.

In this implementation manner, the second access point is the second access point that is currently occupying the channel on which the first access point works, and the associated station of the second access point is a station, among the associated stations of the second access point that is currently occupying the channel, that is communicating with the second access point that is currently occupying the channel.

In this case, the processor 1404 being configured to determine to-be-scheduled stations of the first access point and transmission powers of the first access point for the to-be-scheduled stations according to the first interference power parameters, the second interference power parameters, and a transmission power of the second access point that is currently occupying the channel may be: the processor 1404 being specifically configured to select the to-be-scheduled stations from the associated stations of the first access point, where a transmission power required by the to-be-scheduled station is less than the second interference power parameter, and the transmission power of the second access point is less than a third interference power parameter, where the third interference power parameter is at least one of the first interference power parameters and is used to indicate a transmission power of the second access point under a condition that communication between the first access point and the to-be-scheduled station is not affected, and determine that the transmission power of the first access point for the to-be-scheduled station is the transmission power required by the to-be-scheduled station. The quantity of the second access points that currently occupy the channel may be at least one, and similarly the quantity of the stations that are communicating with the second access points that currently occupy the channel may also be at least one.

In another implementation manner of this embodiment, the first interference power parameter received by the receiver 1402 includes a harmless power reduction value of the second access point, where the harmless power reduction value of the second access point is used to indicate a numerical value by which a maximum transmission power of the second access point needs to be reduced under the condition that communication between the first access point and the associated station of the first access point is not affected; the second interference power parameter received by the receiver 1402 includes a harmless power reduction value of the first access point, where the harmless power reduction value of the first access point is used to indicate a numerical value by which a maximum transmission power of the first access point needs to be reduced under the condition that communication between the second access point and the associated station of the second access point is not affected; and the associated station of the second access point is a station, among the associated stations of the second access point that is currently occupying the channel, that is communicating with the second access point that is currently occupying the channel.

In this case, the processor 1404 being configured to determine to-be-scheduled stations of the first access point and transmission powers of the first access point for the to-be-scheduled stations according to the first interference power parameters, the second interference power parameters, and a transmission power of the second access point that is currently occupying the channel may be: the processor 1404 being specifically configured to use a difference between the maximum transmission power of the second access point and the first interference power parameter as a harmless transmission power upper limit of the second access point, and use a difference between the maximum transmission power of the first access point and the second interference power parameter as a harmless transmission power upper limit of the first access point; select the to-be-scheduled stations from the associated stations of the first access point, where a transmission power required by the to-be-scheduled station is less than a harmless transmission power upper limit of the first access point for the associated station of the second access point, and the transmission power of the second access point is less than a harmless transmission power upper limit of the second access point for the to-be-scheduled station; and determine that the transmission power of the first access point for the to-be-scheduled station is the transmission power required by the to-be-scheduled station. The quantity of the second access points that currently occupy the channel may be at least one, and similarly the quantity of the stations that are communicating with the second access points that currently occupy the channel may also be at least one.

In this embodiment, the transmitter 1401 being configured to send scheduling indication signaling to the to-be-scheduled stations may be: the transmitter 1401 being specifically configured to: when the to-be-scheduled stations include at least two stations, send the scheduling indication signaling to each station of the at least two stations in turn, or send the scheduling indication signaling to the at least two stations at the same time.

In this embodiment, a frame structure of the scheduling indication signaling or the scheduling indication response signaling may include at least one of a frame control field, a receive address field, a transmission address field and a transmission power field, where different values of the frame control field indicate that a frame with the frame structure is scheduling indication signaling or scheduling indication response signaling, and a value of the transmission power field is the determined transmission power.

In the embodiment, a receiver 1402 receives first interference power parameters fed back by associated stations of the first access point, and receives second interference power parameters sent by a second access point; if determining that a channel on which the first access point works is currently being occupied by the second access point, a processor 1404 determines to-be-scheduled stations of the first access point and transmission powers of the first access point for the to-be-scheduled stations according to the first interference power parameters, the second interference power parameters, and a transmission power of the second access point that is currently occupying the channel; finally, a transmitter 1401 sends scheduling indication signaling to the to-be-scheduled stations at the transmission powers determined by the processor 1404, and the receiver 1402 receives scheduling indication response signaling sent by a schedulable station among the to-be-scheduled stations; and after receiving the scheduling indication response signaling, the transmitter 1401 sends a data frame to the schedulable station at a transmission power corresponding to the schedulable station among the determined transmission powers. In this way, multiple access points located in a mutual effect area of the access points can perform downlink transmission at the same time, thereby improving utilization of network spectrum resources, and in this embodiment, the determined transmission power is carried in air-interface scheduling indication signaling and scheduling indication response signaling, without the need of additional signaling overheads, and ensuring real-time power control. In addition, this embodiment is based on autonomous distributed behaviors of the access points, and therefore a central scheduler is unneeded.

Figure 15:
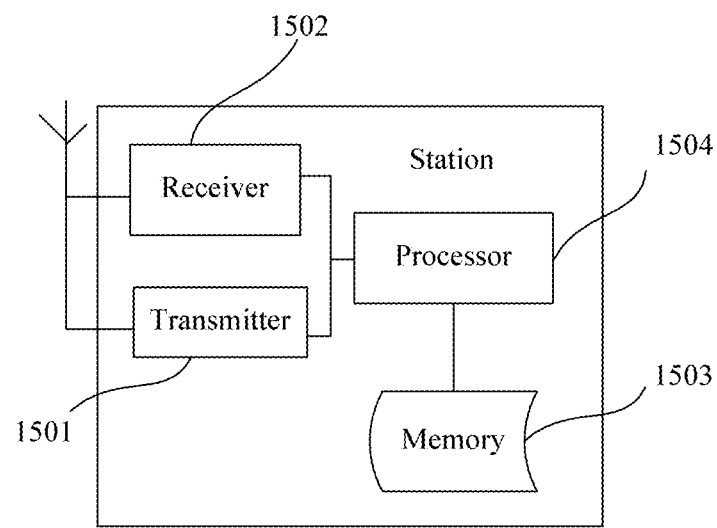
FIG. 15 is a schematic structural diagram of a station according to an embodiment of the present invention.

FIG. 15 is a schematic structural diagram of a station according to an embodiment of the present invention. The station in this embodiment can implement the process in the embodiment shown in FIG. 2 of the present invention. As shown in FIG. 15, the station may include: a transmitter 1501, a receiver 1502, a memory 1503 and a processor 1504 that is separately connected to the transmitter 1501, the receiver 1502 and the memory 1503. Certainly, the station may further include generic parts such as an antenna and an input/output apparatus, which are not limited herein in this embodiment of the present invention.

The memory 1503 is configured to store a group of program code;

the processor 1504 is configured to invoke the program code stored in the memory 1503, to measure a first interference power parameter, where the first interference power parameter is used to indicate a transmission power or a transmission power reduction value of a second access point under a condition that communication between a first access point and the station is not affected, where the first access point is an associated access point of the station, and a coverage area of the first access point overlaps a coverage area of the second access point;

the transmitter 1501 is configured to feed back the first interference power parameter measured by the processor 1504 to the first access point, so that when the first access point determines that a channel on which the first access point works is currently being occupied by the second access point, the first access point determines, according to the first interference power parameter, a second interference power parameter that is sent by the second access point and a transmission power of the second access point that is currently occupying the channel, that the station is a to-be-scheduled station of the first access point, and a transmission power of the first access point for the station, where the second interference power parameter is used to indicate a transmission power or a transmission power reduction value of the first access point under a condition that communication between the second access point and an associated station of the second access point is not affected;

the receiver 1502 is configured to receive scheduling indication signaling that is sent by the first access point at the determined transmission power;

the processor 1504 is further configured to: after the receiver 1502 receives the scheduling indication signaling, determine that the station is schedulable by the first access point;

the transmitter 1501 is further configured to: after the processor 1504 determines that the station is schedulable by the first access point, send scheduling indication response signaling to the first access point, where both the scheduling indication signaling and the scheduling indication response signaling carry the determined transmission power; and the receiver 1502 is further configured to: after the transmitter 1501 sends the scheduling indication response signaling, receive a data frame that is sent by the first access point at the determined transmission power.

In an implementation manner of this embodiment, the first interference power parameter measured by the processor 1504 includes a harmless transmission power upper limit of the second access point, where the harmless transmission power upper limit of the second access point is an allowed maximum transmission power of the second access point under the condition that communication between the station and the first access point is not affected; and the processor 1504 is specifically configured to measure received energy of a signal that is sent by the station to the second access point by using a full power; determine a harmless power reduction value of the second access point according to the received energy and a clear channel assessment threshold of the station; and use a difference between the maximum transmission power of the second access point and the harmless power reduction value as the harmless transmission power upper limit of the second access point.

In another implementation manner of this embodiment, the first interference power parameter measured by the processor 1504 includes a harmless power reduction value of the second access point, where the harmless power reduction value of the second access point is used to indicate a numerical value by which the maximum transmission power of the second access point needs to be reduced under the condition that communication between the station and the first access point is not affected; and the processor 1504 is specifically configured to measure received energy of a signal that is sent by the station to the second access point by using a full power; and determine the harmless power reduction value of the second access point according to the received energy and a clear channel assessment threshold of the station.

In the embodiment, after a processor 1504 measures a first interference power parameter, a transmitter 1501 feeds back the first interference power parameter to a first access point, so that when the first access point determines that a channel on which the first access point works is currently being occupied by a second access point, the first access point determines that the station is a to-be-scheduled station of the first access point and a transmission power of the first access point for the station according to the first interference power parameter, a second interference power parameter sent by the second access point, and a transmission power of the second access point that is currently occupying the channel. Then, after a receiver 1502 receives scheduling indication signaling that is sent by the first access point at the determined transmission power, if the processor 1504 determines that the station is schedulable, the transmitter 1501 sends scheduling indication response signaling to the first access point; and finally, the receiver 1502 receives a data frame that is sent by the first access point at the determined transmission power. In this way, multiple access points located in a mutual effect area of the access points can perform downlink transmission at the same time, thereby improving utilization of network spectrum resources, and in this embodiment, the determined transmission power is carried in air-interface scheduling indication signaling and scheduling indication response signaling, without the need of additional signaling overheads, and ensuring real-time power control. In addition, this embodiment is based on autonomous distributed behaviors of the access points, and therefore a central scheduler is unneeded.

Persons skilled in the art may understand that the accompanying drawings are merely schematic diagrams of exemplary embodiments, and modules or processes in the accompanying drawings are not necessarily required for implementing the present invention.

Persons skilled in the art may understand that the modules in the apparatuses provided in the embodiments may be arranged in the apparatuses in a distributed manner according to the description of the embodiments, or may be arranged in one or more apparatuses that are different from those described in the embodiments. The modules in the foregoing embodiments may be combined into one module, or split into a plurality of submodules.

Finally, it should be noted that the foregoing embodiments are merely intended to describe the technical solutions of the present invention, but not to limit the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A data frame sending method, comprising:
receiving, by a first access point, first interference power parameters fed back by associated stations of the first access point, wherein a coverage area of the first access point overlaps a coverage area of a second access point, wherein the first interference power parameter indicates, such that communication between the first access point and the associated station of the first access point is not affected, one of a transmission power of the second access point or a transmission power reduction value of the second access point;
receiving, by the first access point, second interference power parameters sent by the second access point, wherein the second interference power parameters are fed back by associated stations of the second access point to the second access point, wherein the second interference power parameter indicates, such that communication between the second access point and the associated station of the second access point is not affected, one of a transmission power or a transmission power reduction value of the first access point under a condition;
determining, by the first access point and in response to the first access point determining that a channel on which the first access point works is currently being occupied by the second access point, to-be-scheduled stations of the first access point and transmission powers of the first access point for the to-be-scheduled stations according to the first interference power parameters, the second interference power parameters, and a transmission power of the second access point that is currently occupying the channel;
sending, by the first access point, scheduling indication signaling to the to-be-scheduled stations at the determined transmission powers;
receiving scheduling indication response signaling sent by a schedulable station among the to-be-scheduled stations; and
sending, by the first access point, a data frame to the schedulable station at a transmission power corresponding to the schedulable station among the determined transmission powers.

2. The method according to claim 1, wherein the first interference power parameter comprises a harmless transmission power upper limit of the second access point;
wherein the harmless transmission power upper limit of the second access point is an allowed maximum transmission power of the second access point where communication between the first access point and the associated station of the first access point is not affected;
wherein the second interference power parameter comprises a harmless transmission power upper limit of the first access point; and
wherein the harmless transmission power upper limit of the first access point is an allowed maximum transmission power of the first access point where communication between the second access point and the associated station of the second access point is not affected.

3. The method according to claim 1, wherein the determining that the channel on which the first access point works is currently being occupied by the second access point comprises performing at least one of:
determining, by the first access point, in response to the first access point receiving the scheduling indication signaling by listening on the channel on which the first access point works, and further in response to the first access point determining that a transmission address carried in the received scheduling indication signaling is an address of the second access point, that the channel is currently being occupied by the second access point; and
determining, by the first access point, in response to if the first access point receiving the scheduling indication response signaling by listening on the channel on which the first access point works, and further in response to the first access point determining that a receive address carried in the received scheduling indication response signaling is an address of the second access point, that the channel is currently being occupied by the second access point.

4. The method according to claim 1, wherein the second access point is the second access point that is currently occupying the channel on which the first access point works;
wherein the associated station of the second access point is a station, among the associated stations of the second access point that is currently occupying the channel, that is communicating with the second access point that is currently occupying the channel; and
wherein the determining the to-be-scheduled stations of the first access point and transmission powers of the first access point for the to-be-scheduled stations comprises:
selecting, by the first access point, the to-be-scheduled stations from the associated stations of the first access point, wherein a transmission power required by the to-be-scheduled station is less than the second interference power parameter, wherein the transmission power of the second access point is less than a third interference power parameter, wherein the third interference power parameter is at least one of the first interference power parameters and indicates, such that communication between the first access point and the to-be-scheduled station is not affected, a transmission power of the second access point; and
determining, by the first access point, that the transmission power of the first access point for the to-be-scheduled station is the transmission power required by the to-be-scheduled station.

5. The method according to claim 1, wherein the first interference power parameter comprises a harmless power reduction value of the second access point, wherein the harmless power reduction value of the second access point indicates, such that communication between the first access point and the associated station of the first access point is not affected, a numerical value by which a maximum transmission power of the second access point needs to be reduced, wherein the second interference power parameter comprises a harmless power reduction value of the first access point, wherein the harmless power reduction value of the first access point indicates, such that communication between the second access point and the associated station of the second access point is not affected, a numerical value by which a maximum transmission power of the first access point needs to be reduced;

wherein the second access point is the second access point that is currently occupying the channel on which the first access point works, and wherein the associated station of the second access point is a station, among the associated stations of the second access point that is currently occupying the channel, that is communicating with the second access point that is currently occupying the channel; and wherein the determining the to-be-scheduled stations of the first access point and transmission powers of the first access point for the to-be-scheduled stations comprises:

using, by the first access point, a difference between the maximum transmission power of the second access point and the first interference power parameter as a harmless transmission power upper limit of the second access point, and using a difference between the maximum transmission power of the first access point and the second interference power parameter as a harmless transmission power upper limit of the first access point, wherein the harmless transmission power upper limit of the second access point is an allowed maximum transmission power of the second access point such that communication between the first access point and the associated station of the first access point is not affected, and wherein the harmless transmission power upper limit of the first access point is an allowed maximum transmission power of the first access point such that communication between the second access point and the associated station of the second access point is not affected;

selecting, by the first access point, the to-be-scheduled stations from the associated stations of the first access point, wherein a transmission power required by the to-be-scheduled station is less than a harmless transmission power upper limit of the first access point for the associated station of the second access point, and wherein the transmission power of the second access point is less than a harmless transmission power upper limit of the second access point for the to-be-scheduled station; and determining, by the first access point, that the transmission power of the first access point for the to-be-scheduled station is the transmission power required by the to-be-scheduled station.

6. The method according to claim 1, wherein the sending scheduling indication signaling to the to-be-scheduled station comprises:

sending, by the first access point and when the to-be-scheduled stations comprise at least two stations, the scheduling indication signaling to each station of the at least two stations in turn, or sending, by the first access point, the scheduling indication signaling to the at least two stations at the same time.

7. The method according to claim 1, wherein a frame structure of at least one of the scheduling indication signaling or the scheduling indication response signaling comprises at least one of a frame control field, a receive address field, a transmission address field and a transmission power field;

wherein different values of the frame control field indicate that a frame with the frame structure is one of scheduling indication signaling or scheduling indication response signaling, and a value of the transmission power field is the determined transmission power.

8. A data frame receiving method, comprising:

measuring, by a station, a first interference power parameter, wherein the first interference power parameter indicates, such that communication between a first access point and the station is not affected, one of a transmission power or a transmission power reduction value of a second access point, wherein the first access point is an associated access point of the station, and wherein a coverage area of the first access point overlaps a coverage area of the second access point;

feeding back, by the station, the first interference power parameter to the first access point, so that, when the first access point determines that a channel on which the first access point works is currently being occupied by the second access point, the first access point determines, according to the first interference power parameter, further according to a second interference power parameter that is sent by the second access point and further according to a transmission power of the second access point that is currently occupying the channel, that the station is a to-be-scheduled station of the first access point, and a transmission power of the first access point for the station, wherein the second interference power parameter indicates, such that communication between the second access point and an associated station of the second access point is not affected, one of a transmission power or a transmission power reduction value of the first access point;

sending, by the station, after the station receives scheduling indication signaling that is sent by the first access point at the determined transmission power, and in response to determining that the station is schedulable by the first access point, scheduling indication response signaling to the first access point; and receiving, by the station, a data frame that is sent by the first access point at the determined transmission power.

9. The method according to claim 8, wherein the first interference power parameter comprises a harmless transmission power upper limit of the second access point, wherein the harmless transmission power upper limit of the second access point is an allowed maximum transmission power of the second access point where communication between the station and the first access point is not affected.

10. The method according to claim 9, wherein the measuring the first interference power parameter comprises:

measuring, by the station, received energy of a signal that is sent by the station to the second access point by using a full power;

determining, by the station, a harmless power reduction value of the second access point according to the received energy and a clear channel assessment threshold of the station, wherein the harmless power reduction value of the second access point indicates a numerical value by which the maximum transmission power of the second access point needs to be reduced so that communication between the station and the first access point is not affected; and using, by the station, a difference between the maximum transmission power of the second access point and the harmless power reduction value as the harmless transmission power upper limit of the second access point.

11. The method according to claim 8, wherein the first interference power parameter comprises a harmless power reduction value of the second access point, wherein the harmless power reduction value of the second access point indicates a numerical value by which the maximum transmission power of the second access point needs to be reduced so that communication between the station and the first access point is not affected.

12. The method according to claim 11, wherein the measuring the first interference power parameter of the second access point for the station comprises:

measuring, by the station, received energy of a signal that is sent by the station to the second access point by using a full power; and determining, by the station, the harmless power reduction value of the second access point according to the received energy and a clear channel assessment threshold of the station.

13. A data frame sending apparatus, wherein the data frame sending apparatus is configured to be disposed in a first access point, the data frame sending apparatus comprising:

a receiving module, configured to receive first interference power parameters fed back by associated stations of the first access point, and further configured to receive second interference power parameters sent by a second access point, wherein the second interference power parameters are fed back by associated stations of the second access point to the second access point, wherein a coverage area of the first access point overlaps a coverage area of the second access point, wherein the first interference power parameter indicates, such that communication between the first access point and the associated station of the first access point is not affected, one of a transmission power or a transmission power reduction value of the second access point, and wherein the second interference power parameter indicates, such that communication between the second access point and the associated station of the second access point is not affected, one of a transmission power or a transmission power reduction value of the first access point;

a sending module;

a processor connected to the receiving module and to the sending module;

a non-transitory computer readable medium connected to the processor and having stored thereon instructions, that when executed by the processor, cause the processor to:

determine that a channel on which the first access point works is currently being occupied by the second access point; and determine to-be-scheduled stations of the first access point and transmission powers of the first access point for the to-be-scheduled stations according to the first interference power parameters, the second interference power parameters, and a transmission power of the second access point that is currently occupying the channel; and wherein the sending module is configured to send scheduling indication signaling to the to-be-scheduled stations at the determined transmission powers determined by the determining module, and after the receiving module receives scheduling indication response signaling sent by a schedulable station among the to-be-scheduled stations, send a data frame to the schedulable station at a transmission power corresponding to the schedulable station among the determined transmission powers, and wherein the receiving module is further configured to receive, after the sending module sends the scheduling indication signaling, the scheduling indication response signaling sent by the schedulable station among the to-be-scheduled stations.

14. The apparatus according to claim 13, wherein the first interference power parameter received by the receiving module comprises a harmless transmission power upper limit of the second access point, wherein the harmless transmission power upper limit of the second access point is an allowed maximum transmission power of the second access point where communication between the first access point and the associated station of the first access point is not affected; and the second interference power parameter received by the receiving module comprises a harmless transmission power upper limit of the first access point, wherein the harmless transmission power upper limit of the first access point is an allowed maximum transmission power of the first access point where communication between the second access point and the associated station of the second access point is not affected.

15. The apparatus according to claim 13, wherein the instructions causing the processor to determine that the channel on which the first access point works is currently being occupied by the second access point comprise instructions, that when executed by the processor, cause the processor to perform at least one of:

determine that the channel is currently being occupied by the second access point in response to receiving the scheduling indication signaling by listening on the channel on which the first access point works, and further in response to determining that a transmission address carried in the received scheduling indication signaling is an address of the second access point; and determine that the channel is currently being occupied by the second access point in response to receiving the scheduling indication response signaling by listening on the channel on which the first access point works, and further in response to determining that a receive address carried in the received scheduling indication response signaling is an address of the second access point,.

16. The apparatus according to claim 13, wherein the second access point is the second access point that is currently occupying the channel, and wherein the associated station of the second access point is a station, among the associated stations of the second access point that is currently occupying the channel, that is communicating with the second access point that is currently occupying the channel; and wherein the instructions causing the processor to determine the to-be-scheduled stations of the first access point and transmission powers of the first access point for the to-be-scheduled stations comprise instructions, that when executed by the processor, cause the processor to:
select the to-be-scheduled stations from the associated stations of the first access point, wherein a transmission power required by the to-be-scheduled station is less than the second interference power parameter, and wherein the transmission power of the second access point is less than a third interference power parameter; and
determine that the transmission power of the first access point for the to-be-scheduled station is the transmission power required by the to-be-scheduled station, wherein the third interference power parameter is at least one of the first interference power parameters and indicates a transmission power of the second access point where a condition that communication between the first access point and the to-be-scheduled station is not affected.

17. The apparatus according to claim 13, wherein the first interference power parameter received by the receiving module comprises a harmless power reduction value of the second access point, wherein the harmless power reduction value of the second access point indicates, such that communication between the first access point and the associated station of the first access point is not affected, a numerical value by which a maximum transmission power of the second access point needs to be reduced, wherein the second interference power parameter received by the receiving module comprises a harmless power reduction value of the first access point, wherein the harmless power reduction value of the first access point indicates, such that communication between the second access point and the associated station of the second access point is not affected, a numerical value by which a maximum transmission power of the first access point needs to be reduced, wherein the second access point is the second access point that is currently occupying the channel on which the first access point works, and wherein the associated station of the second access point is a station, among the associated stations of the second access point that is currently occupying the channel, that is communicating with the second access point that is currently occupying the channel; and
wherein the instructions causing the processor to determine the to-be-scheduled stations of the first access point and transmission powers of the first access point for the to-be-scheduled stations comprise instructions, that when executed by the processor, cause the processor to:
use a difference between the maximum transmission power of the second access point and the first interference power parameter as a harmless transmission power upper limit of the second access point;
use a difference between the maximum transmission power of the first access point and the second interference power parameter as a harmless transmission power upper limit of the first access point;
select the to-be-scheduled stations from the associated stations of the first access point, wherein a transmission power required by the to-be-scheduled station is less than a harmless transmission power upper limit of the first access point for the associated station of the second access point, and wherein the transmission power of the second access point is less than a harmless transmission power upper limit of the second access point for the to-be-scheduled station; and
determine that the transmission power of the first access point for the to-be-scheduled station is the transmission power required by the to-be-scheduled station.

18. A data frame receiving apparatus, wherein the data frame receiving apparatus is configured to be disposed in a station, the data frame receiving apparatus comprising a computer including a non-transitory computer readable medium storing program modules executable by the computer, the modules including:
a measuring module, configured to measure a first interference power parameter, wherein the first interference power parameter is used to indicate a transmission power or a transmission power reduction value of a second access point under a condition that communication between a first access point and the station is not affected, wherein the first access point is an associated access point of the station, and a coverage area of the first access point overlaps a coverage area of the second access point;
a sending module, configured to feed back the first interference power parameter measured by the measuring module to the first access point, so that when the first access point determines that a channel on which the first access point works is currently being occupied by the second access point, the first access point determines, according to the first interference power parameter, a second interference power parameter that is sent by the second access point and a transmission power of the second access point that is currently occupying the channel, that the station is a to-be-scheduled station of the first access point, and a transmission power of the first access point for the station, wherein the second interference power parameter is used to indicate a transmission power or a transmission power reduction value of the first access point under a condition that communication between the second access point and an associated station of the second access point is not affected;
a receiving module, configured to receive scheduling indication signaling that is sent by the first access point at the determined transmission power; and
a determining module, configured to: after the receiving module receives the scheduling indication signaling, determine that the station is schedulable by the first access point,
wherein the sending module is further configured to, after the determining module determines that the station is schedulable by the first access point, send scheduling indication response signaling to the first access point; and
the receiving module is further configured to: after the sending module sends the scheduling indication response signaling, receive a data frame that is sent by the first access point at the determined transmission power.

19. The apparatus according to claim 18, wherein the first interference power parameter measured by the measuring module comprises a harmless transmission power upper limit of the second access point, wherein the harmless transmission power upper limit of the second access point is an allowed maximum transmission power of the second access point where communication between the station and the first access point is not affected.

20. The apparatus according to claim 18, wherein the first interference power parameter measured by the measuring module comprises a harmless power reduction value of the second access point, wherein the harmless power reduction value of the second access point indicates a numerical value by which the maximum transmission power of the second access point needs to be reduced where communication between the station and the first access point is not affected.

* * * * *